(12) United States Patent
Calder et al.

(10) Patent No.: US 9,565,250 B2
(45) Date of Patent: Feb. 7, 2017

(54) DATA TRANSFER SERVICE

(71) Applicant: MICROSOFT TECHNOLOGY LICENSING, LLC, Redmond, WA (US)

(72) Inventors: Bradley G. Calder, Bellevue, WA (US); Andrew James Edwards, Bellevue, WA (US); Shuitao Fan, Sammamish, WA (US); Chun Yuan, Bellevue, WA (US); Jaidev Haridas, Redmond, WA (US); Matthew Douglas Hendel, Seattle, WA (US); Aung Maw Oo, Kirkland, WA (US); Phillip Taron, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 79 days.

(21) Appl. No.: 14/291,851

(22) Filed: May 30, 2014

(65) Prior Publication Data
US 2015/0350316 A1 Dec. 3, 2015

(51) Int. Cl.
*G06F 11/00* (2006.01)
*H04L 29/08* (2006.01)
(Continued)

(52) U.S. Cl.
CPC ....... *H04L 67/1095* (2013.01); *G06F 11/0778* (2013.01); *G06F 11/1004* (2013.01);
(Continued)

(58) Field of Classification Search
CPC .................................................. G06F 11/0778
See application file for complete search history.

(56) References Cited

U.S. PATENT DOCUMENTS 7,603,583 B2 * 10/2009 Yamamoto ............ G06F 3/0617
714/6.32
8,090,690 B2 * 1/2012 Zamkoff ............ G06F 11/1456
707/640
(Continued)

FOREIGN PATENT DOCUMENTS

WO 2013110966 A1 8/2013

OTHER PUBLICATIONS

"Offline Disk Import", Published on: Nov. 10, 2013 Available at: https://developers.google.com/storage/docs/early-access.
(Continued)

*Primary Examiner* — Christopher McCarthy
(74) *Attorney, Agent, or Firm* — Ben Tabor; Kate Drakos; Micky Minhas

(57) ABSTRACT

In various embodiments, methods and systems for transferring data using a storage medium are provided. A storage medium may be shipped by a customer to a datacenter such that the data on the storage medium is copied to a storage associated with the datacenter or data in the storage is copied to the storage medium. The datacenter may support a cloud computing infrastructure that provides a storage account to the customer that is associated with the data copied from or copied to the storage medium. The storage medium further corresponds to a data transfer manifest that includes at least in part data mapping between storage service infrastructure and data in the storage medium. It is contemplated that embodiments of the present invention may further be implemented with data transfer service components that support a client component, storage service component, and a data transfer management component.

40 Claims, 15 Drawing Sheets

(51) Int. Cl.
  *G06F 11/10* (2006.01)
  *G06F 11/07* (2006.01)
  *H04L 29/06* (2006.01)
  *G06F 21/60* (2013.01)
  *G06F 21/62* (2013.01)

(52) U.S. Cl.
  CPC .......... *G06F 11/1076* (2013.01); *G06F 21/60* (2013.01); *G06F 21/6209* (2013.01); *H04L 63/0428* (2013.01); *H04L 63/08* (2013.01)

(56) References Cited

U.S. PATENT DOCUMENTS

| | | | |
|---|---|---|---|
| 8,417,967 | B2 | 4/2013 | Foster et al. |
| 2012/0084626 | A1* | 4/2012 | Pandey ............... G06F 3/0605 714/758 |
| 2013/0232191 | A1* | 9/2013 | Cheng .................. H04L 67/42 709/203 |
| 2013/0262404 | A1* | 10/2013 | Daga ................ G06F 17/30156 707/692 |
| 2013/0275695 | A1* | 10/2013 | Ponsford ............ G06F 11/1448 711/162 |
| 2013/0346557 | A1* | 12/2013 | Chang ................. G06F 9/45558 709/217 |
| 2014/0067990 | A1 | 3/2014 | Abdelhameed et al. |
| 2014/0075239 | A1 | 3/2014 | Prathipati et al. |
| 2015/0199769 | A1* | 7/2015 | Kruglick ............... G06Q 30/04 705/30 |
| 2015/0309882 | A1* | 10/2015 | Harrison ............ G06F 17/3007 714/6.23 |

OTHER PUBLICATIONS

Tan, et al., "Tracking of Data Leaving the Cloud", In Proceedings of IEEE 11th International Conference on Trust, Security and Privacy in Computing and Communications, Jun. 25, 2012, pp. 137-144.
"AWS Import/Export", Published on: Jul. 11, 2011 Available at: http://aws.amazon.com/importexport/?ref_=pe_12300_20444540.
"IDrive—Need for Online Backup and Sync", Retrieved on: Apr. 3, 2014 Available at: http://www.idrive.com/online-backup/.
"Mozy Data Shuttle Features", Published on: Feb. 9, 2014 Available at: http://mozy.com/product/features/data-shuttle.
"Announcing Windows Azure Import/Export Service Preview (Windows Azure Storage)", Published on: Oct. 31, 2013 Available at: http://blogs.msdn.com/b/windowsazurestorage/archive/2013/11/01/announcing-windows-azure-import-export-service-preview.aspx.
"Import/Export Service REST API Reference", Retrieved on: Apr. 14, 2014 Available at: http://msdn.microsoft.com/en-us/library/dn529096.aspx.
"International Search Report & Written Opinion Received for PCT Application No. PCT/US2015/032772", Mailed Date: Nov. 5, 2015, 23 Pages.
"Import/Export Service Log File Format", Retrieved From<<http://web.archive.org/web/20140924081427/http://msdn.microsoft.com/en-us/library/azure/dn529094.aspx>> May 12, 2014, 9 Pages.
"Import/Export Service Manifest File Format", Retrieved From<<https://web.archive.org/web/20140923234329/http://msdn.microsoft.com/en-us/library/azure/dn529098.aspx>> May 12, 2014, 6 Pages.
"Preparing Hard Drives for an Import Job", Retrieved at<< https://web.archive.org/web/20141204103109/http://msdn.microsoft.com/en-us/library/dn529089.aspx>> Dec. 4, 2014, 5 Pages.
"Repairing an Export Job", Retrieved From<<https://web.archive.org/web/20141204100827/http://msdn.microsoft.com/en-us/library/dn529106.aspx>> Dec. 4, 2014, 4 Pages.
"Repairing an Import Job", Retrieved From<<https://web.archive.org/web/20141121143618/http://msdn.microsoft.com/en-us/library/dn529086.aspx>> Nov. 21, 2014, 6 Pages.
"Reviewing Job Status with Copy Log Files", Retrieved at <<https://web.archive.org/web/20141204074259/http://msdn.microsoft.com/en-us/library/dn529118.aspx>> Dec. 4, 2014, 1 Page.
"ScottGu's Blog—Windows Azure: Import/Export Hard Drives, VM ACLs, Web Sockets, Remote Debugging, Continuous Delivery, New Relic, Billing Alerts and More", Retrieved From<<http://weblogs.asp.net/scottgu/windows-azure-import-export-hard-drives-vm-acls-web-sockets-remote-debugging-continuous-delivery-new-relic-billing-alerts-and-more>> Nov. 4, 2013, 28 Pages.
"Setting Up the WAImportExport Tool", Retrieved at<<https://web.archive.org/web/20140311021451/http://msdn.microsoft.com/en-us/library/dn529112.aspx>> Mar. 11, 2014, 3 Pages.
"Sneakernet—Wikipedia, the free encyclopedia", Retrieved From<<https://en.wikipedia.org/wiki/Sneakernet>>, Aug. 14, 2015, 7 Pages.
Wilcox, Jeff, "Use the Microsoft Azure Import/Export Service to Transfer Data to Blob Storage", Retrieved at <<https://github.com/tamram/azure-content/blob/24874573e38471d0ad1237b68d5025c24d4d9d8c/articles/storage-import-export-service.md>> May 17, 2014, 7 Pages.
Menezes, et al., "Handbook of Applied Cryptography, Chapter 9, Hash Functions and Data Integrity", In CRC Press Series on Discrete Mathematics and Its Applications, Jan. 1, 1997, 64 Pages.
Milener, Gene, "What's new in SQL Database V12", Retrieved From<<https://azure.microsoft.com/en-us/documentation/articles/sqldatabase-v12-whats-new/?rnd=1>>, Aug. 10, 2015, 4 Pages.

\* cited by examiner

DATA TRANSFER SERVICE

BACKGROUND

Transferring data between computing infrastructures can facilitate different types of on premise projects including the replacement and upgrade of storage, data consolidation, server maintenance, and datacenter relocation. Network-based data transfer, such as over the internet, may present certain restrictions and limitations to data transfer. Available bandwidth, customer link to the internet, and the speed to upload and download data over the internet can be limiting factors. Internet service providers may also retain control of network traffic making data transfer expensive and/or slow. Physically moving storage media, in order to transfer data, may help improve a data transfer project in situations where uploading over the Internet is prohibitively expensive, time consuming, or not feasible due to the available bandwidth. However, conventional methods for circumventing network-based data transfer fail to provide integrated management, security, data mapping, and data validation in data transfer services.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide a method for transferring data using storage media. This may be accomplished by receiving a storage medium at a storage service infrastructure. In particular, in one example, the storage medium may be a hard drive shipped by a customer and received at a datacenter, such that, the data on the hard drive is copied to storage associated with the datacenter. Other types of storage media are contemplated with embodiments of the present invention. The datacenter can include a storage service infrastructure that is part of a distributed cloud computing infrastructure. The distributed cloud computing infrastructure can provide a storage account to the customer that shipped the storage medium. A data transfer manifest may be associated with data transfer objects that facilitate data transfer operations for storage medium. The data transfer manifest, in particular, provides data mapping for data identified for data transfer operations. The storage medium corresponds to a data transfer manifest. The data transfer manifest may optionally be stored in the storage medium. The data transfer manifest can also be communicated electronically to the storage service infrastructure. In embodiments, additional data transfer objects are communicated separately to the storage service infrastructure. The data transfer manifest may be stored in the storage medium using a data transfer client component during an import job. The data on the storage medium may then be copied, based on the data transfer manifest, to storage associated with the datacenter. The storage account may provide access to the data copied to the storage.

Additionally, a data transfer manifest may be generated using a data transfer storage service component during an export job. The export job comprises a storage medium that corresponds with a data transfer manifest, the storage medium is shipped to the customer, such that, data copied from a storage account in the distributed cloud computing infrastructure to the storage medium. The customer may then copy the data in the storage medium to the customer infrastructure.

It is contemplated that the data transfer service supports a data transfer service infrastructure having the data transfer client component and the data transfer storage service component, that provide for data security, data mapping, and data validation, and a data transfer management component that is configured for tracking, generating tasks, and providing logical states for data transfer jobs.

BRIEF DESCRIPTION OF THE DRAWINGS

The present invention is described in detail below with reference to the attached drawing figures, wherein.

DETAILED DESCRIPTION

Figure 1:
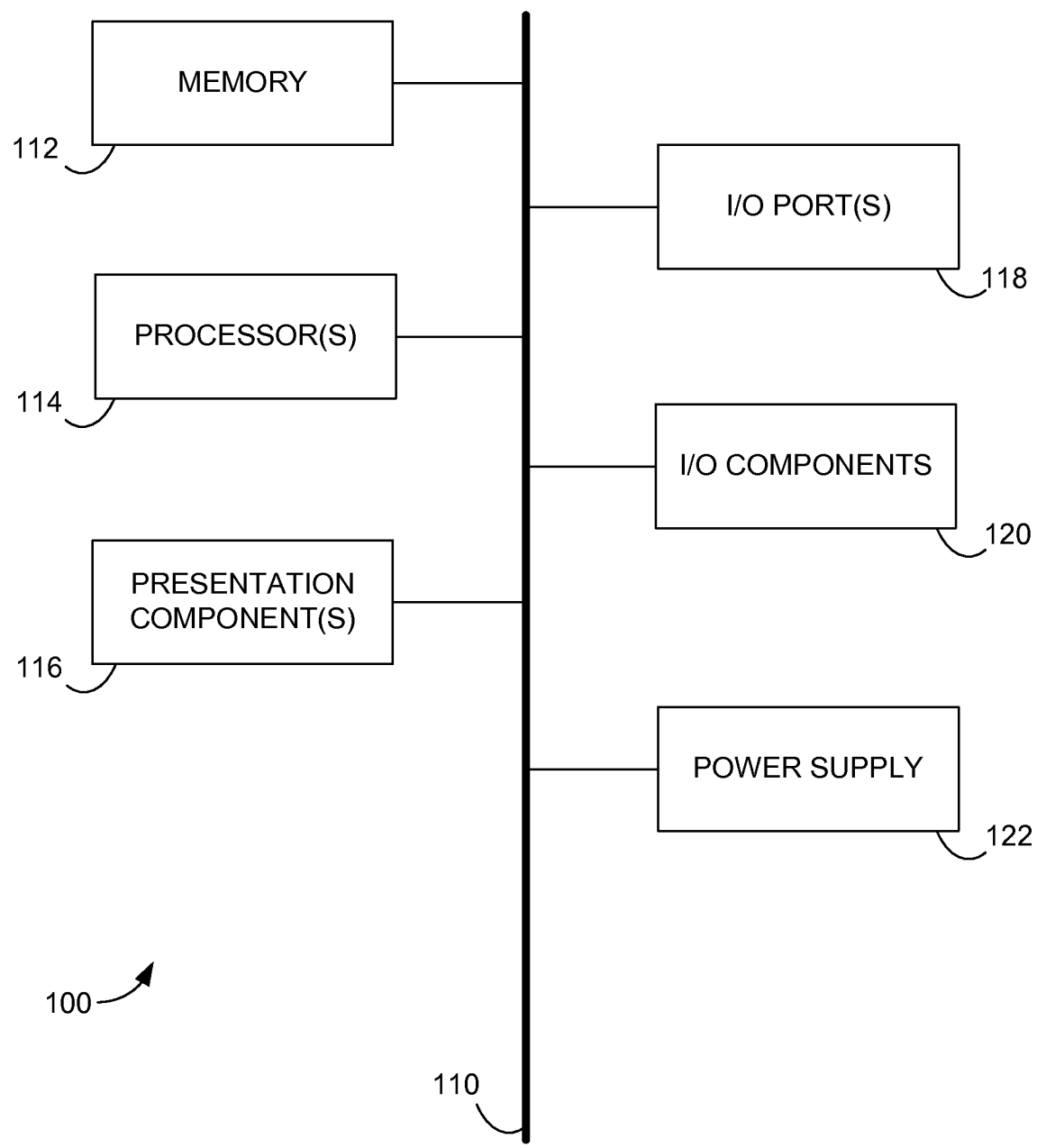
FIG. 1 is a block diagram of an exemplary computing environment suitable for use in implementing embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

Transferring data between computing infrastructures can facilitate different types of on premise projects including the replacement and upgrade of storage, data consolidation, server maintenance, and datacenter relocation. Network-based data transfer, such as over the internet, may present certain restrictions and limitations to data transfer. Available bandwidth and the speed to upload and download data over the internet can be limiting factors. Internet service providers may also retain control of network traffic making data transfer expensive and/or slow. Physically moving storage media, in order to transfer data, may help improve a data transfer project in situations where uploading over the Internet is prohibitively expensive, time consuming or not feasible due to the available bandwidth. However, conventional methods circumventing network-based data transfer fail to provide integrated management, security, data mapping, and data validation in data transfer services.

Embodiments of the present invention provide a simple and efficient method for transferring data using storage media. At a high level, data transfer service components are implemented to provide data transfer services (e.g., importing and exporting of customer data) associated with a customer infrastructure (e.g., one or more customer computing devices) and a storage service infrastructure. The data transfer service can provide an interface which allows a customer to perform data transfer operations. In an exemplary embodiment the interface is a Representational State Transfer (REST) interface which allows a customer to perform data transfer operations. The data transfer service components can utilize REST Application Programming Interfaces (APIs) to enable programmatic control of the data transfer jobs. The REST interface can be implemented and/or invoked in via a web-based portal to further facilitate performing one or more of the data transfer operations for the storage service infrastructure and the customer infrastructure. Other combination and variations of interfaces are contemplated with embodiments of the present invention.

A customer infrastructure (e.g., one or more customer computing devices) may implement a data transfer client component and a storage service infrastructure may implement a data transfer storage service component to facilitate data transfer operations. A data transfer operation can include a request to an interface that connects the data transfer client component or a data transfer storage service component to the storage service such that the operation is executed to perform a data transfer job. In addition, a storage medium may be configured with a manifest to either import data from the storage medium to storage account storage of a storage service infrastructure or export data from the storage service infrastructure to storage of the customer infrastructure.

The storage service comprises several components including data transfer service components for implementing data transfer service operations. The data transfer service components include the data transfer client component, and the data transfer storage service component, and can further include a data transfer management component in a networked environment. The data transfer client component and the data transfer storage service component may each support securing the data transfer service by protecting the storage service infrastructure from malicious storage media and protecting customer data. In addition, in either an import job or export job, a data transfer client component and the data transfer storage service component may provide for verifying the data transferred in order to identify and correct errors (e.g., errors caused by physical damage to the storage medium during transport) or failures (e.g., failures during data transfer process) and then the identified errors may be corrected. Further, the data transfer management component may be configured for tracking storage media that are transported from the customer infrastructure, generating tasks based on the progress of the data transfer jobs associated with the storage media, and providing for display, internally to storage service administrators, and externally to customers, the status of the storage media during a storage service import or export job.

For purposes of a detailed discussion below, embodiments of the present invention are described with reference to a storage media and a plurality of data transfer service components in a data transfer service infrastructure; however the storage media and the data transfer service components depicted herein are merely exemplary and should not be construed as limiting. For example, the use of drive or hard drive interchangeably with storage medium is not meant to be limiting. Further, while embodiments of the present invention may generally refer to a data transfer service infrastructure and the schematics described herein, it is understood that the techniques described may be extended to other implementation contexts.

Embodiments of the present invention may be described by way of exemplary implementations in a data transfer service infrastructure that can be a portion of a storage service infrastructure. During an import job, a customer may configure a storage medium (e.g., hard drive) using a data transfer client component. The storage medium includes data which the customer would like transferred from their location (e.g., customer infrastructure) to a storage associated with a storage account in a storage service infrastructure. The data transfer client component may be used to associate a storage medium with a data transfer manifest used in facilitating data transfer operations. Data transfer operations include copying the data on the storage medium to the storage account storage. During an export job, the data transfer storage service component may be used associate a storage medium with a data transfer manifest used in facilitating data transfer operations. Data transfer operations include copying the data on the storage medium to customer infrastructure storage.

Embodiments of the present invention further utilize a data transfer manifest. The data transfer manifest (hereinafter "manifest") generally refers to a configuration file that describes the mapping between storage service infrastructure data and data on the storage medium associated with a data transfer job. The manifest can be stored into the storage medium and/or have at least associated portions thereof communicated separately in order to perform storage services. The manifest may be communicated to the storage service infrastructure electronically and separately from the storage medium.

The manifest can be created with a plurality of different data transfer objects that facilitate performing data transfer operations. Data transfer objects refer to constant or variable parameters of the data transfer service that provide for a specific function in data transfer operations. Data transfer objects can include a location object, a data object, a security object, and a validation object that facilitate performing data transfer operations associated with each corresponding object or combination of objects.

By way of examples, in an import job, the location object (e.g., blob path and file path) may help identify the location, for example in a storage account, where the customer data should be stored, and in an export job, the location object (e.g., blob path and file path) may identify the location, for example in a storage account, from which the customer data should be retrieved. A data object associated with an import job or an export job can identify data (e.g., blob or file) that can be transferred between the storage medium and the storage service infrastructure. The security object (e.g., an encryption security object, or a key security object) can encrypt and/or authenticate the storage medium, and the validation object may be used in verifying the copied data and facilitating repair of any failures or errors. Additional data transfer objects may be communicated separately to the storage service infrastructure. For example, an alternate or complimentary security object (e.g., hash key) may not be communicated in the storage medium but communicated separately (e.g., electronically using a secure channel) to the storage service infrastructure. Any other variations and combinations of data transfer manifest data transfer objects are contemplated within embodiments of the present invention.

In embodiments of the present invention, the data transfer service components may support securing data transfer service based on securing the storage service infrastructure and protecting customer data. The data transfer client component and the data transfer storage service component may both secure the data transfer service based on a corresponding role of the components in the different storage service jobs. In this regard, it is contemplated that the components may perform similar securing tasks in securing the data transfer service depending on a corresponding role in a data transfer job as discussed in more detail below.

The data transfer client component may facilitate securing the storage medium with security objects. The data transfer client component may request a drive unique identifier (e.g., serial number of a drive) when creating an import job. The data transfer client component may also facilitate encryption and/or identification of the type of encryption (e.g., MICROSOFT WINDOWS BitLocker) used for the storage medium. The drive unique identifier and the encryption keys for the storage medium may be communicated to the storage service infrastructure. The drive unique identifier and the encryption keys can be communicated using a secure channel. The encryption keys can be used to decrypt the storage medium. It is contemplated that the encryption keys and/or the drive unique identifier can be used to perform data transfer operations including at least one of identifying, validating, and decrypting the storage medium.

Similarly, during an export job, the storage medium may also be encrypted. The data transfer storage service component can facilitate the encryption of the storage medium and identification of the type of encryption (e.g., MICROSOFT WINDOWS BitLocker) used for the storage medium. The encryption keys for the storage medium may be communicated to the customer infrastructure. The encryption keys can be communicated using a secure channel. The encryption keys can be used to decrypt the storage medium. It is further contemplated that the encryption keys and/or the drive unique identifier can be used to perform data transfer operations including at least one of identifying, validating, and decrypting the storage medium.

In an alternate embodiment, a portion of the storage medium may be hashed to support securing customer data and the storage service infrastructure. In particular, the portion may refer to a section of the storage medium that facilitates access to retrieve the data on the storage medium. The portion of the storage medium may include the master boot record with a boot sector and/or metadata that define files, back up critical system data, buffer file system changes, and free space allocation. The portion of the storage medium may also include a master file table that describes the files on the volume, including file names, time stamps, compression, encryption etc. As such, the portion of the storage medium can be a beginning portion of the storage medium. By way of example, the data transfer client may generate a hash of the portion of the storage medium, encrypt the hash, and send the encrypted hash. The encrypted hash can be sent separately from the storage medium using a secure channel. Upon receiving the storage medium at the storage service infrastructure, the storage medium may then be decrypted by the data transfer storage service component based on the encrypted hash to verify the integrity of the portion of the storage medium. When the integrity of the portion of the storage medium is verified, the storage medium can provided for data transfer processing. In particular, the storage medium may be accessed based at least in part on the verified portion of the storage medium. Other variations of hashing techniques are contemplated with embodiments of the present invention.

During an import job or an export job, a storage medium can be protected from a malicious party who may intercept the storage medium in transport from customer infrastructure to a storage service infrastructure or vice versa. In particular, the security concern may be that in transit the storage medium can be intercepted and malicious data can be stored on the storage medium. However, because the data transfer service components support an encrypted storage medium prior to shipping the storage medium, the malicious party would not know the encryption key to decrypt the storage medium and thus could not store malicious data into the encrypted region of the drive, resulting in the customer data being protected from malicious actions. In embodiments, an encryption key for the storage medium and the encrypted storage medium are not communicated together, as discussed in more detail below.

The data transfer service components may further support securing and protecting the storage service infrastructure. Upon a storage medium for an import job arriving at the storage service infrastructure, additional secure steps may be performed. The encrypted storage medium may be first attached to a virtual machine (VM) without reading the storage medium in the host operating system. The encryption key may be provided to the VM. Each VM can be segregated, based on physical or virtual security mechanisms, from the storage service infrastructure until the storage medium is verified such that additional security to the storage service and the hosting operating system. Each VM can be used for one storage medium, and the VM can be assumed to be compromised once the storage medium has been mounted. As discussed above, the VM may facilitate the process of verifying the integrity of the portion of the storage medium based on the hash encryption. The VM may further run software that should upload the data from the storage medium to the storage account, and the software can send notifications as the software makes progress copying the data into a storage account of a customer. The progress on the VM can be monitored to confirm advances in the copying process. Additional investigations may be undertaken to confirm whether a bug is impeding progress or if the VM has been compromised by a malicious drive.

The data transfer service components may further support validation and repair. At a high level, in order to validate that customer's data is correct through the transfer process, a checksum of data on storage medium may be stored. For example, an MD5 checksum of each file on a drive. For large files, files may be divided into chunks with corresponding stored checksums for each chunk. By way of example, for an import job at the customer infrastructure, checksums can be computed and stored on the storage medium as the customer is populating the storage medium with data.

At the storage service infrastructure during the import job, the checksums can be validated as the data is imported into a storage account. For example, the MD5s of each file as the file is written to the customer's storage account. It is contemplated that other types of checksum variations beyond MD5 may be implemented with embodiments of the present invention. If the checksum does not match, instead of importing the data, information can be recorded (e.g., log object) about the data that did not match into known location associated with the customer's import job. A repair operation may be executed based on the recorded information. In particular, the data transfer client component may be used to identify the missing or damaged data and upload the parts that were missing. The data uploaded via the data transfer client component may also be verified using checksum.

During an export job, checksum data, for individual files or portions of large individual files, can be stored on the storage medium using the data transfer storage service component. Upon receiving the storage medium, the customer may use the data transfer client component to validate the data on the storage medium that are transferred to the customer infrastructure. If the checksum does not match, a repair operation, according to methods of the present invention, can be implemented. A repair operation may be executed based on configuring the repair operation to automatically repair data during the checksum validation operation. Alternatively, the repair operation can be independently executed. The data transfer client component may be used to identify the missing or damaged data and download the parts that were missing from the storage service infrastructure. The data downloaded via the data transfer client component may also be verified using checksum.

Data transfer management may be facilitated by a data transfer management component. In particular, the data transfer management component may be configured to provide tracking for storage media that are transported from the customer infrastructure, generating tasks based on the progress of the data transfer job associated with the storage media, and registering and providing the registered logical states via an interface (e.g., display) internally to storage service administrators, and externally to customers, the logical states of the storage media during a storage service import or export job. For example, the storage data transfer management component may be responsible for tracking the storage medium from the time the customer configures the data on the storage medium through to a point where the storage medium is shipped back to the customer and/or processed at the customer infrastructure (e.g., a repair operation on the storage medium).

The data transfer management component may additionally support the logistics and generation of tasks associated with transporting the storage medium, receiving the storage medium, retrieving the data from the storage medium or loading data onto the storage medium, and transporting the storage medium back to the customer. In this regard, the progress of a storage medium during a data transfer job may be referenced and provided to a designated entity. In particular, storage service administrators may be provided with an internal view of the status based on the progress of the storage medium, while customers may have a client-service interface that displays an external view of the status of the data transfer job based on the progress of the storage medium during the data transfer job. As such, status information may be tailored for the different types of designated entities when informing the designated entity of the status of the storage medium.

Accordingly, in a first aspect of the present invention, one or more computer storage media storing computer-useable instructions that, when executed by one or more processors, causes the one or more computing devices to perform a method for importing data on storage media, is provided. The method includes accessing a storage medium. The storage medium corresponds to a data transfer manifest. The data transfer manifest may be configured with data transfer objects as parameters. The storage medium is associated with an import job. The method further includes referencing the data transfer manifest. The data transfer manifest at least provides data mapping between storage service infrastructure and data in the storage medium. The method further includes copying data from the storage medium to the storage service infrastructure, based on the data transfer manifest.

In a second aspect of the present invention, one or more computer storage media storing computer-useable instructions that, when executed by one or more processors, causes the one or more computing devices to perform a method for exporting data onto storage media is provided. The method includes accessing a storage medium. The storage medium is associated with an export job, the export job corresponding to one or more data transfer objects. The method includes copying data from a storage service infrastructure to the storage medium. The method includes generating a data transfer manifest based on the one or more data transfer objects and the data copied from the storage service infrastructure, the data transfer manifest corresponds to the storage medium.

In a third aspect of the present invention, a computer-implemented method for monitoring data transfer for storage media is provided. The method includes receiving a notification that indicates that a data transfer job has been created. The data transfer job is created at least in part using a data transfer client component. The method further includes determining a progress of the data transfer job for at least one data transfer artifact. The at least one data transfer artifact is associated with a logical state based on the progress of the data transfer job. The method includes registering the logical state of the at least one data transfer artifact.

In a fourth aspect of the present invention, a system for import data on storage media is provided. The system includes a data transfer client component configured for preparing a storage medium for an import job. Preparing the storage medium includes receiving a selection of data to be imported to a storage service infrastructure, copying the data to the storage medium; and generating a data transfer manifest for the storage medium. The system further includes the data transfer client component configured for creating the import job using one or more data transfer objects as parameters. The system also includes a data transfer storage service component configured for accessing the storage medium. The storage medium corresponds to the data transfer manifest. The data transfer storage service component is further configured for referencing the data transfer manifest. The data transfer manifest at least provides data mapping between a storage service infrastructure and data in the storage medium. The data transfer storage service component is configured for copying data from the storage medium to the storage service infrastructure, based on the data transfer manifest, and generating a log object for the import job. The log object comprises, at least in part, a data error event associated with the data processed from the storage medium.

In a fifth aspect of the present invention, a system for exporting data to storage media is provided. The system includes a data transfer client component configured for receiving an indication of data to be exported from a storage service infrastructure. The system includes the data transfer client component configured for creating an export job using one or more data transfer objects as parameters. The system also includes the data transfer storage service component configured for accessing the storage medium associated with an export job. The data transfer storage service component is further configured for copying data from the storage service infrastructure to the storage medium, generating a log object for the export job; and generating a data transfer manifest, based on the one or more data transfer objects and the data copied from the storage service infrastructure, the data transfer manifest corresponds to the storage medium for the storage medium.

In a sixth aspect of the present invention, a computer-implemented method for verifying storage media for data transfer is provided. The method includes receiving a hash security object using a secure channel. The hash security object secures a portion of a storage medium that facilitates access to the data. The method also includes verifying the integrity of the portion of the storage medium based on the hash security object. The method further includes upon verifying the integrity of the portion of the storage medium, providing the storage medium for data transfer processing.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

With additional reference to FIG. 2, a block diagram depicting an exemplary data transfer service infrastructure 200 (hereinafter "infrastructure") suitable for use in embodiments of the invention is described. Generally, infrastructure 200 is a distributed computing and storage system for transferring data on storage media, in accordance with embodiments of the present invention. The infrastructure 200 comprises multiple computing devices similar to the computing device 100 described with reference to FIG. 1. The infrastructure 200 should not be interpreted as having any dependency or requirement related to any single module/component or combination of modules/components illustrated therein. Each may comprise a single device or multiple devices cooperating in a distributed environment. For instance, components may comprise multiple devices arranged in a distributed environment that collectively provide the functionality described herein. Additionally, other components not shown may also be included within a network environment.

Figure 2:
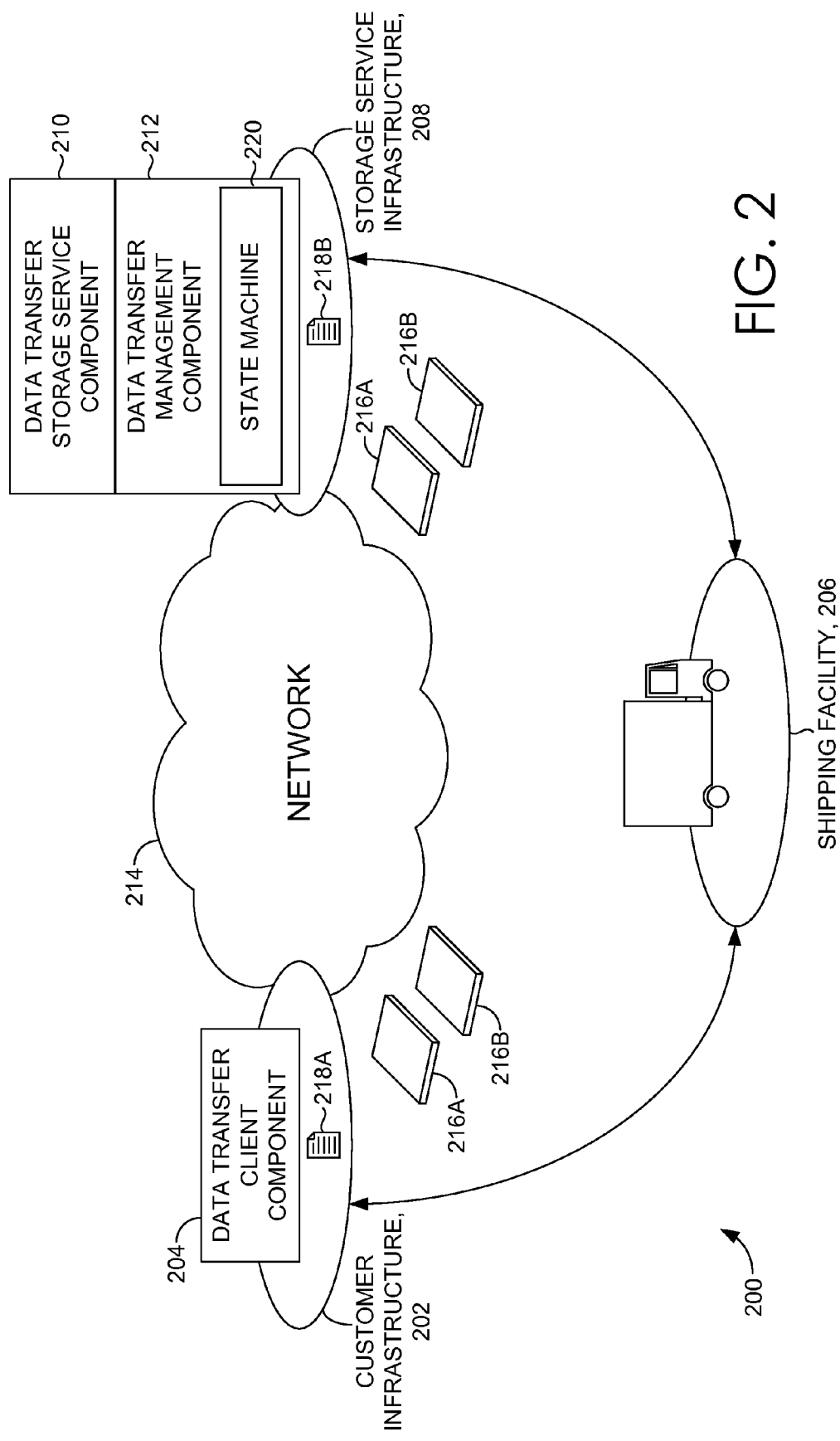
FIG. 2 is a block diagram of an exemplary data transfer service infrastructure in which embodiments of the invention may be employed.

With continued reference to FIG. 2, among other components not shown, the infrastructure 200 generally includes a customer infrastructure 202 having a data transfer client component 204, a shipping facility 206, a storage service infrastructure 208 having data transfer storage service component 210 and a data transfer management component 212, all in communication with one another via a network 214. The network may include, without limitation, one or more local area networks (LANs) and/or wide area networks (WANs). Such networking environments are commonplace in offices, enterprise-wide computer networks, intranets and the Internet. Accordingly, the network is not further described herein.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With continued reference to FIG. 2, the customer infrastructure 202 generally refers to one or more computing devices having customer infrastructure storage media. The customer infrastructure storage media (not shown) may contain data to be copied from the customer infrastructure 202 to a storage service infrastructure 208. The data may be copied from the customer infrastructure storage media to the storage media 216B that is shipped, such that, data is copied from the storage media 216B to the storage service infrastructure 208. The client storage infrastructure 202 may further comprise the data transfer client component 204 configured to support client-side data transfer operations associated with data transfer jobs.

The storage service infrastructure 208 generally refers to a distributed storage system having computing devices and storage service infrastructure storage media for supporting a storage service. The storage service may provide a data transfer service, such that, data from the customer infrastructure may be copied via the storage media 216B to the storage service infrastructure. The storage service infrastructure 208 may further comprise a data transfer storage service component 210 and data transfer management component 212 to support storage-service-side data transfer operations associated with data transfer jobs.

The data transfer client component 204 of the customer infrastructure 202 may function as a portion of the data transfer service facilitating data transfer operations. In particular, during an import job, the data transfer client component 204 generates a manifest 218A associated with the import job for a storage medium 216A. The manifest 218A describes the mapping between data storage service infrastructure and data in the storage medium for an import job. For example, a file in a hard drive may be mapped to a blob in the storage service infrastructure 208. During an import job, the manifest 218A can be created by the data transfer client component 204 as part of the preparation of the storage medium 216A. The manifest 218A may be stored on the storage medium 216A prior to shipping the storage medium 216A to the storage service infrastructure 208.

The data transfer storage service component 210 of the storage service infrastructure 208 may function as a portion of the data transfer service facilitating data transfer operations. The data transfer service, upon processing a storage medium associated with an import job or export job, generates a log object in association with the storage account of the data transfer job. For example, when the data transfer storage service component 210 processes a storage medium associated with a data transfer job, the data transfer storage service component 210 may generate a log object that is a copy log file. In embodiments, the log object is associated with a storage account from which the data is imported to or exported from. The log object can contain details about each file that was imported and exported. The log object may be written to block blobs and associated with operations for configuring a location of the storing the log object in the storage service infrastructure and retrieving the storage a URI for the log object. A URI to each copy log file may be returned when a query of the status of the job is requested.

The log object may in particular log failures to copy data (e.g., individual files or parts of a file) to the storage service. In this regard, there may be two different types of log objects written to the storage account; they include: an error log, which is generated in the event of an error, and a verbose log that may not be enabled by default, but may be enabled by a customer action. The verbose log may contain complete information about the status of the copy operation for data (e.g., every blob (for an import job) or file (for an export job)), whereas the error log may contain only the information for data that encountered errors during the data transfer job. The object may be written to block blobs containing XML descriptions of events that occurred while copying data between the storage medium and the customer's account. Several different types of XML elements are contemplated with embodiments of the present invention. XML elements can be related to data transfer objects, for example, XML elements include Blob/FilePath associated with the location object, Hashes for all or portions of the data, Metadata, Properties, associated with authentication security object (e.g., storage account key) and Offsets and lengths for portions of the data.

The log object can identify different types of issues or error events associated with the storage medium. Error events may include errors in accessing or reading the manifest file, incorrect authentication security object (e.g., key), storage medium read/write error. Additional error events may be directed particularly to the data associated with the storage medium, for example, blobs and files. As such, by way of example, additional error events can include incorrect or conflicting blob or names, missing files, blob not found, truncated files (the files on the disk are smaller than specified in the manifest), corrupted file content (for import, detected with a checksum mismatch), corrupted blob metadata and property files (detected with checksum), incorrect schema for the blob properties and/or metadata files.

During an export job, the data transfer storage service component 210 generates a manifest 218B associated with the export job of a storage medium 216B. The manifest 218B describes the mapping between data in the storage service infrastructure and data in the storage medium 216B for an export job. For example, blobs in the storage service infrastructure 208 may be mapped to a file in a hard drive. During an export job, the manifest 218B can be created by the data transfer storage service component 210 after receiving the storage medium 216B from the customer infrastructure 202. The manifest 218B may be stored on the storage medium 216B prior to shipping the storage medium 216B back to the customer infrastructure 202.

The manifest 218A and 218B ("manifests"), which are generated at the customer infrastructure 202 and the storage service infrastructure 208 based on the storage service job, may be associated with different data transfer objects to support data transfer operations, where the operations include copying, managing, secure, and validating data. The manifest may include an enumeration of the data on the storage medium and the mapping to the storage service. For example, the manifest may enumerate the files intended for upload and the mappings from the files to blobs in the storage service. The manifest may further include information about the metadata and properties to associate with data transferred to the storage service infrastructure. The manifest may also include a list of the actions to take when data being uploaded conflicts with existing data in the storage service. The manifest may also include checksums of segments of each file. Checksums generally refer to a small-size of data computed from an arbitrary block of data for the purpose of detecting error which may have been introduced during transmission or storage.

The manifests may be written with Extensible Markup Language (XML) descriptions. Several different types of XML elements are contemplated with embodiments of the present invention. XML elements can be related to data transfer objects, for example, XML elements include blob file path, associated with the location object, storage account key associated with authentication security object, hashes for portions of file, metadata, and properties associated with a validation object.

The manifests may further be backed up. The manifests can be automatically backed up into the storage service infrastructure executing an operation to configure backing up the manifests. In this regard, it is contemplated that the manifest can be simultaneously stored on an associated storage medium and a storage service infrastructure. The backups of manifests can be stored in association with the storage account associated with the job. The name of the manifests may be a predefined name but that can be overridden by specifying a different name based on an operation at the data transfer client component. A Uniform Resource Identifier ("URI") of the backup manifest for a data transfer job can also be retrieved via an operation at the data transfer client component. The URI can be returned as a manifest URI for each drive.

The data transfer management component 212 ("management component") of the storage service infrastructure 208 may be configured to manage a plurality of tasks associated with data transfer operations. In particular, the management component 212 may support tracking storage media, for example, the management component 212 may support tracking for storage medium 216A and storage medium 216B that are transported between the customer infrastructure 202 and the storage service infrastructure 208. The management component 212 may further be configured for generating tasks based on the progress of the data transfer job associated with the storage media, for example, storage service administrators may be directed to receive a package, unpack the package, and move one or more storage media to a staging area, insert drives into machines, remove drives from machines, and ship drives back to customers.

Additionally, the management component 212 may be configured for registering logical states of data transfer artifacts and providing the registered logical states via an interface (e.g., display) internally to storage service administrators, and externally to customers, the status of the storage media during a storage service import or export job. In particular, the management component 212 can include a state machine module (not shown) that manages different data transfer artifacts (e.g., job, drive, drive bay, package, ticket and health) and provides logical states for each monitored data transfer artifact based on the progress of the import or export job. The logical state may be specifically based on attributes of the data transfer artifact, as discussed in more detail below.

Figure 3A:
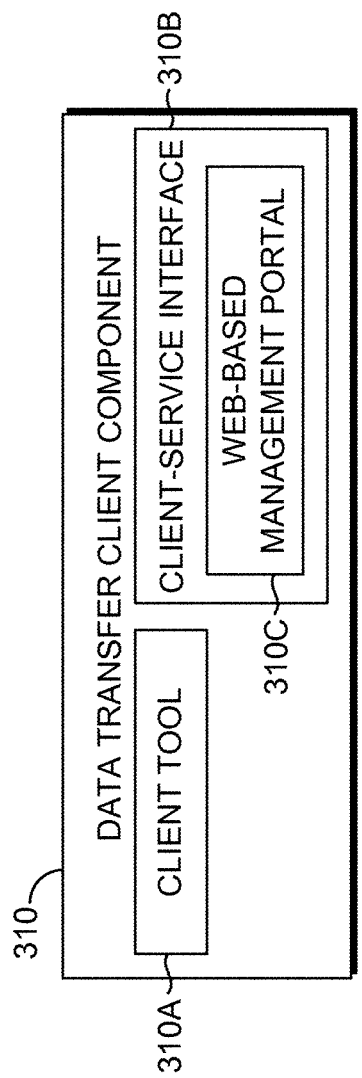
FIG. 3A is a schematic diagram showing an exemplary customer infrastructure, in accordance with embodiments of the present invention.

With reference to FIG. 3A, the data transfer client component 310 provides interfaces to facilitate data transfer operations. In one embodiment, the data transfer client component 310 can include a client tool 310A and a client-service interface 310B. The data transfer client component 310 interfaces are configured to facilitate creating data transfer jobs 340. The interfaces can be implemented and/or invoked in via a web-based portal to further facilitate performing one or more of the data transfer operations for the storage service infrastructure and the customer infrastructure. The data transfer service components can utilize REST Application Programming Interfaces (APIs) to enable programmatic control of the data transfer jobs. In particular, the REST APIs may provide Hypertext Transfer Protocol Secure ("HTTPS") endpoints for communicating between the customer infrastructure and the storage service infrastructure. The data transfer client component may access the storage service via the client-service interface 310B (e.g., web-based management portal 310C). Access to the storage service through the client-service interface 310B can be secured by providing access using mutual authentication management certificates to ensure that a request made to the storage service is secured. It is contemplated that an implementation of the REST APIs can be the client-service interface 310B as a web-based management portal or a client-service interface 310B as a programmed interface (not shown) to access the storage service.

Figure 3B:
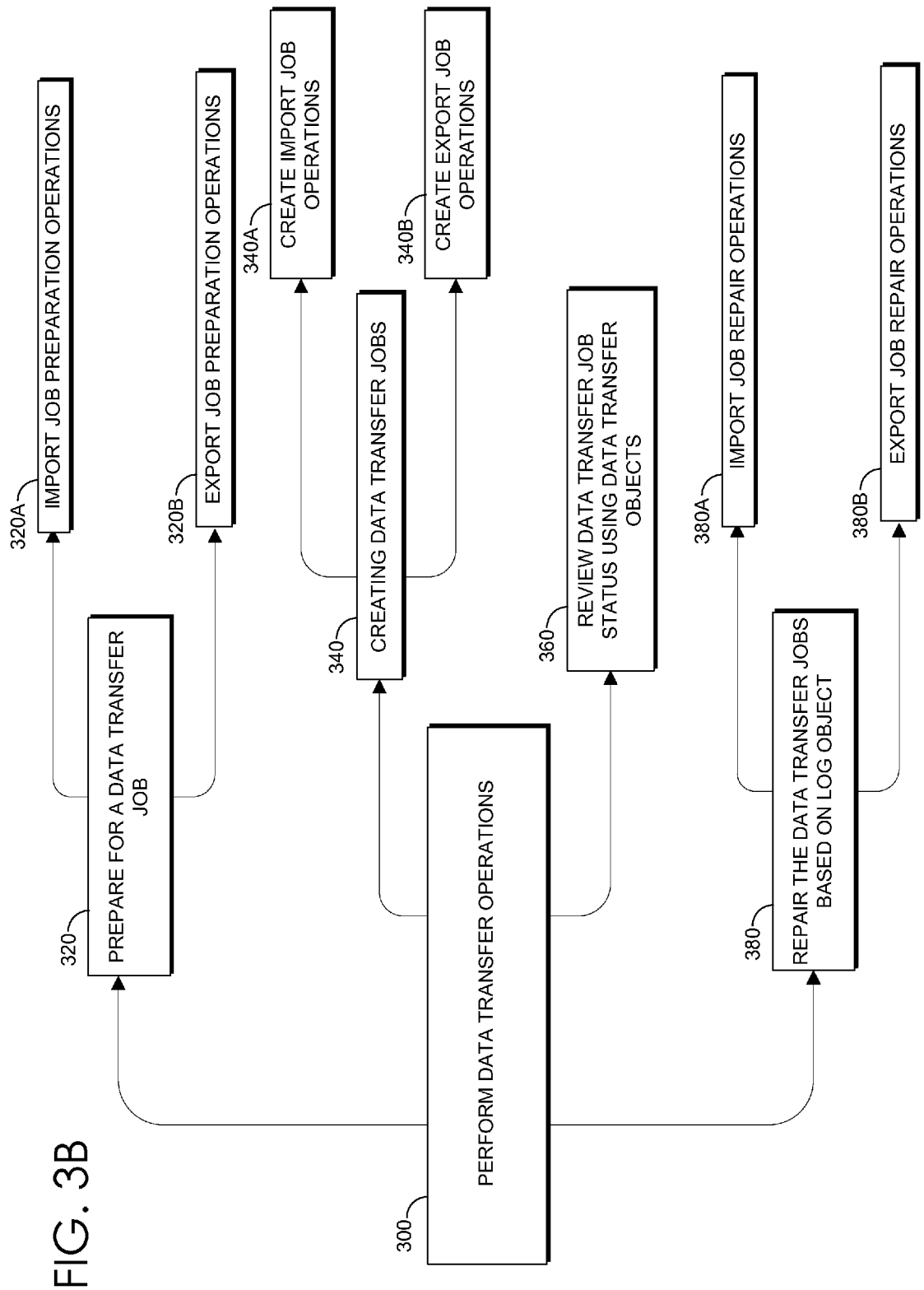
FIG. 3B is a flow diagram showing exemplary data transfer operations, in accordance with embodiments of the present invention.

With reference to FIG. 3B, the data transfer client component 310 may support performing data transfer operations. Data transfer operations can include preparing storage media for data transfer jobs 320, creating data transfer jobs 340, reviewing job status 360 based on data transfer objects, and repairing data transfer jobs based on a log object 380. The data transfer client component 310 may, in one embodiment, be an executable file installed at the customer infrastructure (e.g., a customer computing device) from which the data transfer client component is executed and used to facilitate storage services in accordance with embodiments of the present invention. Preparing a storage medium may include satisfying one or more prerequisites. It is contemplated that one or more of the prerequisites are not mandatory but preferred in order to prepare the storage medium for a data transfer job. Prerequisites may include a subscription to a storage service of the storage service infrastructure, a storage account associated with the subscription, an account key for the storage account, and an encrypted storage medium.

The data transfer client component 310 can create data transfer jobs. Creating data transfer jobs can include customer actions and data service component operations that may be similar and/or overlapping to achieve data transfer goals, as described in more detail below. The data transfer client component 310 may be configured to create an import job and an export job. The import job may be created using the client tool 310A and client-service interface 310B. Creating the import job can include preparing the storage medium 320 with the client tool 310A. Preparing the storage medium for an import job may include several different import job preparation operations 320A performed at the data transfer client component 310. The import job preparation operations may comprise receiving a selection of data to be imported to a storage service infrastructure, receiving a selection of a destination location for the data, copying the data to the storage medium, and generating an import manifest for the storage medium. The manifest can be stored on the storage medium such that the data on the storage medium is copied from the storage medium by referencing the manifest. The manifest can also alternatively or in addition be communicated to the storage service electronically (e.g., internet).

Preparing a storage medium for an import job comprises actions associated with the import job preparation operations. The actions may include identifying the data to import into the storage service infrastructure, identifying the target location for the data, determining the number of storage media needed, and copying the data to each of the storage media. The storage service infrastructure may support blob storage and/or file storage, such that, data is transferred into blobs and/or files.

Identifying the data to be imported into the storage service infrastructure may include determining which directories and files are imported to the storage service infrastructure. This can be a list of directories, a list of unique files, or combination thereof. When a directory is included, all files in the directory and the subdirectories can be part of the import job. Identifying the target location for the data can include identifying the destination locations in blob service of the storage service infrastructure. In particular, for each directory of a file that may be imported, a destination virtual directory or blob in the storage service infrastructure may be identified. For example a source file a directory can be: H:\Video and a destination blob or virtual directory can be: https://mystorage account.blob.net/video Copying the data to the storage media comprises copying the data to the storage media based on copy sessions. A copy session may be created for each storage medium to which the data is copied. It is contemplated that more than one session may be needed to copy all the data to a single storage medium because a copy session may copy either a single directory or a single blob to a storage medium. If multiple directories or multiples blobs are copied then multiple sessions may be needed. In addition, if specific properties and metadata are associated with blobs imported as part of the import job, the specific properties and metadata associated with blobs are specified by copy session. In order to provide different properties or metadata for additional blobs, a separate copy session may be needed. To set blob properties, a text file can be created on the computing device running the data transfer client component. To set blob metadata, a text file can be created that specifies metadata names and values. A path to one or both of the blob properties or blob metadata may be passed to the data transfer storage service component to associate the blobs with the properties and metadata. It is contemplated that multiple computing devices may run a data transfer client component in parallel in order to copy data to multiple storage media.

The data transfer client component 310 may further create a journal file for each storage medium. The journal file for each storage medium may be needed to create an import job. The journal file may further be used to resume preparation of the storage medium if the data transfer client component is interrupted. A command line interface may be used to facilitate specifying the journal file in order to resume running the data transfer client component. Using the command line interface or any other appropriate interface, copying the data to the storage media may specify several data transfer objects associated with the import job. The command line may include, amongst others, location objects (e.g., source directory and destination directory) authentication security object (e.g., storage account key), an encryption security object (e.g., disk encryption) and a journal file object as parameters associated with the copied data. For example, the storage account key can be the account key for the storage account to which the data will be imported, the disk encryption may encrypt drive when the drive is not already encrypted or when the drive is already encrypted, the disk encryption may specify the key of the drive. Several data transfer objects are contemplated with embodiments of the present invention including source directory, destination directory, session identification, a disposition in case of a conflict, blob type, property file and metadata file.

Additionally, to prepare the storage media for an import job, the command line interface may include data transfer objects that depend on whether the copy session is the first copy session, or a subsequent copy session. By way of example, the first copy session for a drive can have some additional objects to specify the storage account key; the target drive letter; whether the drive must be formatted; whether the drive must be encrypted and if so, the encryption key; and the log directory. As such, the data transfer client may implement a syntax for configuring the objects.

The client tool 310A is further configured to generate a manifest for each storage medium as the storage medium is prepared. As discussed above, the manifest can include an enumeration of the data intended for upload and the mapping between storage service infrastructure and data on the storage medium, checksums of segments of the data, information about the metadata and properties to associate with each the data copied to the storage service infrastructure, and listings of actions to take if data being uploaded have conflicts.

Creating an export job can include preparing for the export job 320B with the client tool 310A. Preparing for an export job may include several different export job preparation operations 320B. The export job preparation operations may comprise identifying a selection of the data to export from the storage service infrastructure, and determining the number of storage media needed. The storage service infrastructure stores the data (e.g., blobs and/or files), such that, data is transferred from storage service infrastructure into the storage medium. In one embodiment, blobs stored in the storage service infrastructure may be converted into individual files that are transferred to the storage medium. The storage service infrastructure may further store snapshot data to be transferred. A snapshot data may refer to a version of the data (e.g., blobs and/or file) captured at a particular time. Snapshot data may be associated with a snapshot object in the data transfer manifest. Snapshot data may have been identified by a user as important when the data was in that version or may have been automatically created by the storage service infrastructure based on one or more policies. In this regard, active data may exist simultaneously with corresponding snapshot data in the storage such that at least portions of either or both may be identified (e.g., via a snapshot object) for an export job. Further, preparing a storage medium for an export job comprises actions associated with the export job preparation operations. The actions may include identifying the data to be exported, and providing the number of storage media needed. It is contemplated that the export job preparation operations and actions may optionally include the storage service identifying a target location for the data based on a user provided target location for the data, Identifying the data may comprise selecting the data in the storage service infrastructure to be copied to the storage medium. In particular, one or more of a relative blob path to select a single blob or snapshot, a blob prefix to select all blobs or snapshots of the given prefix, and all blobs or snapshots in the storage account can be selected to be transferred to the storage medium. Similarly the relative paths to files or snapshots thereof may be identified for transfer.

The client tool 310A is further configured to help the customer identify the number of storage media needed to export the data based on the total size of the data selected to be exported. In one embodiment, a total size of the data to be exported may be calculated. A list of the data to be exported may be generated and the sum of the sizes of the data can be calculated for each data item (e.g., blob) to be exported. The calculation can take into account the size of the storage media, the sizes of data transfer objects and additional overhead of the storage media. For example the manifest size and the disk sector error rate. A summary of the data to be exported may be provided. Based on the total data size, the total number of storage media may be determined.

With continued reference to FIGS. 3A-B, the data transfer client component 310 may further facilitate creating data transfer jobs 340. Creating an import job may be associated with a create import job operation 340A at the client-service interface 310B. In addition several actions may be associated with the create import job operation 340A. For example, infrastructure information (e.g., datacenter location, name and address) to which the storage medium is shipped may be identified. The storage service infrastructure information may be identified from a list of locations, where at least one location supports a storage account of the customer having the storage medium. The storage service infrastructure information may be identified via the client-service interface 310B based on retrieving a list of locations and selecting a location from the returned list of locations.

The client-service interface 310B may support an operation to create an import job. The client-service interface 310B may issue the operation to the storage service. The operation may include several different parameters that facilitate performing data transfer operations. Parameters may be associated with a location object, a security object, or a validation object. By way of example, parameters may include name for the job, storage account name, storage account key, storage service infrastructure information, data transfer job type, return address, list of storage media. Each storage medium may further be associated with parameters including a drive identification, an encryption key, a location of the manifest on the storage medium, and a checksum hash. A customer can the ship the storage medium based on the storage service infrastructure information. The customer receives package information for the storage medium. The client-service interface may update the data transfer job with the package information. The package information may include the carrier and the tracking number for the storage medium shipment.

Creating an export job may be associated with a create export job operation 360B at the client-service interface 310B. In addition, several actions may be associated with the create export job operation 340B. For example, infrastructure information (e.g., datacenter location, name and address) to which the storage medium is shipped may be identified. The storage service infrastructure information may be identified from a list of locations, where at least one location supports a storage account of the customer having the storage medium. The storage service infrastructure information may be identified via the client-service interface 310B based on retrieving a list of locations and selecting a location from the returned list of locations.

The client-service interface 310B may issue an operation to the storage service to create the export job. The operation may include several different data transfer objects as parameters that facilitate performing data transfer operations. Parameters may be associated with a location object, a security object, or a validation object. By way of example, parameters may include name for the job, storage account name, storage account key, storage service infrastructure information, data transfer job type, return address, list of storage media. A customer can then ship the storage medium based on the storage service infrastructure information. The customer receives package information for the storage medium. The client-service interface may update the data transfer job with the package information. The package information may include the carrier and the tracking number for the storage medium shipment.

After the export job has been processed at the storage service infrastructure, the storage media will be returned with encrypted data. The customer may retrieve an encryption security object (e.g., MICROSOFT WINDOWS Bit-Locker key) for each storage medium by calling an operation at the client-service interface. The customer can unlock the storage media encryption using the encryption security object. The storage media contains the manifest on each storage medium. The manifest contains a listing of data on the storage media as well as the original locations in the storage service infrastructure. For example, the manifest can include a list of files on a hard drives and the original blob address for each file in the storage service infrastructure.

With continued reference to FIG. 3, the data transfer client component 310 is configured to facilitate review of the job status 360 with based on log objects. During an import job or export job copying the data to or from the storage medium can be associated log objects. The log object contains detailed status about each file that was imported or exported. The URL to each copy log file can be returned when you query the status of a completed job. For example, a status of data copied may refer to the state or condition of the data (e.g., file) during a copy session. The status associated with data may be designated by different status codes. Several different types of status codes may be used, with a least a portion of the status codes associated with XML elements and data transfer objects.

With continued reference to FIG. 3, the client tool 310A may further be configured to repair a data transfer job 380. Failures may be caused by file corruption, damaged storage media, or change in storage account key. Based on import repair operations, the client tool 310A may use a log object associated with the storage medium to upload missing files (or part of a file) to the storage service infrastructure or download missing files (or part of a file) to the customer infrastructure. In this regard, the repair import is completed based on streaming data over the network. In operation, the log object is passed to the client tool 310A such that the tool completes the import for the file by copying the missing contents across the network. By way of example, the client tool 310A may look for the original file within the corresponding directories in the customer infrastructure and copy the missing range of data to the corresponding blob and/or file in the storage service infrastructure. It is contemplated that the customer may identify corresponding directories in any location to copy the missing range of data to the corresponding blob and/or file in the storage service infrastructure. A command for repairing an import job may include a data transfer objects as parameters, the parameters including a repair file, a log directory, a target directory, an encryption-based security object, a key-based security object, a storage account name, a log object, and a path map file object. In particular, the repair file can track the progress of the repair, and the repair file may be used to resume an interrupted repair. Each drive may be configured with one repair file. When a repair is started for a storage medium, a path of the repair file, which does not yet exist, is passed.

The client tool 310A may also be used to resolve conflicts between two files. In some occasions, the client tool 310A may not be able to find or open a necessary file, either because the file is not found, the file name is ambiguous, or the content of the file is no longer correct. For example, an ambiguous error could occur if the client tool 310A is trying to locate a first file based on a relative path and there is a file with that same name under multiple directories. The path map file object may be used to resolve such an error in that the path may file may specify a name of a path map file that does not exist and the client tool 310A can populate a list of files which the client tool 310A is not able to correctly locate.

With reference to export repair operations 380B, repairing an export job may comprise downloading any data that the storage service infrastructure may have been unable to export, and validating the data on the storage medium was correctly exported. The data transfer client component needs connectivity to the storage service infrastructure to support the repair functionality. The client tool 310A may use a log object associated with the storage medium to download missing files (or part of a file) from the data storage service. In this regard, the repair export is completed based on streaming data over the network. In operation, the log object is passed to the client tool 310A such that the tool completes the export for the file by copying the missing contents across the network. By way of example, the client tool 310A may look for the original file within the corresponding directories in the storage service infrastructure and copy the missing range of data to the customer infrastructure. A command for repairing an export job may include data transfer objects as parameters, the parameters including a repair file, a log directory, a target directory, an encryption-based security object, a key-based security object, a storage account name. In particular, the manifest of the export job, generated by the storage service and stored on the storage medium and optionally in the storage account, may be used to for data validation based on security objects in the manifest. In this regard, any files that are determined to be corrupted can be downloaded and rewritten to the target directories.

In operation, the storage medium containing the exported files may be connected to the customer infrastructure. The client tool 310 may be pointed to the storage medium and a location of the log object. The log object may be downloaded from the storage service infrastructure. The log object contains a list of files that failed to export. In particular, the log object may indicate that a failure occurred while the storage service was downloading the data (e.g., blobs to files) to store in the storage medium. Other components may have been downloaded successfully. As such, client tool 310A may download failed data from the storage service infrastructure and write it to the customer infrastructure. It is further completed that a repair may be performed based receiving an additional storage medium with data used to repair either an import job or export job in accordance with embodiments of the present invention.

With continued reference to FIG. 2, the data transfer management component 212 ("management component") may be configured to provide tracking for storage media that are transported from the customer infrastructure, generating tasks based on the progress of the data transfer job associated with the storage media, and providing for display, internally to storage service administrators, and externally to customers, the status of the storage media during a storage service import or export job. In particular, the management component 212 may include a state machine 220 for facilitating the performance of data transfer operations associated with the management component. The state machine 220 may be a component or module as defined hereinabove. The state machine 220 can support monitoring several different data transfer artifacts associated with logical states. A specific state machine can manage logical states that refer to a construct that alters during a data transfer job with reference to data transfer artifacts, such that, logical states based on retrieved information can be associated with the data transfer artifacts by the state machine as the data transfer job progresses. State machines can include the job state machine, drive state machine, the drive bay state machine, the package state machine, a ticket state machine, and an entity health state machine each associated with corresponding data transfer artifacts. The state machine 220 is configured for managing the progress of a data transfer job and further detecting errors and failures, and facilitating recovering from these failures in association with the logical state machines.

Figure 4:
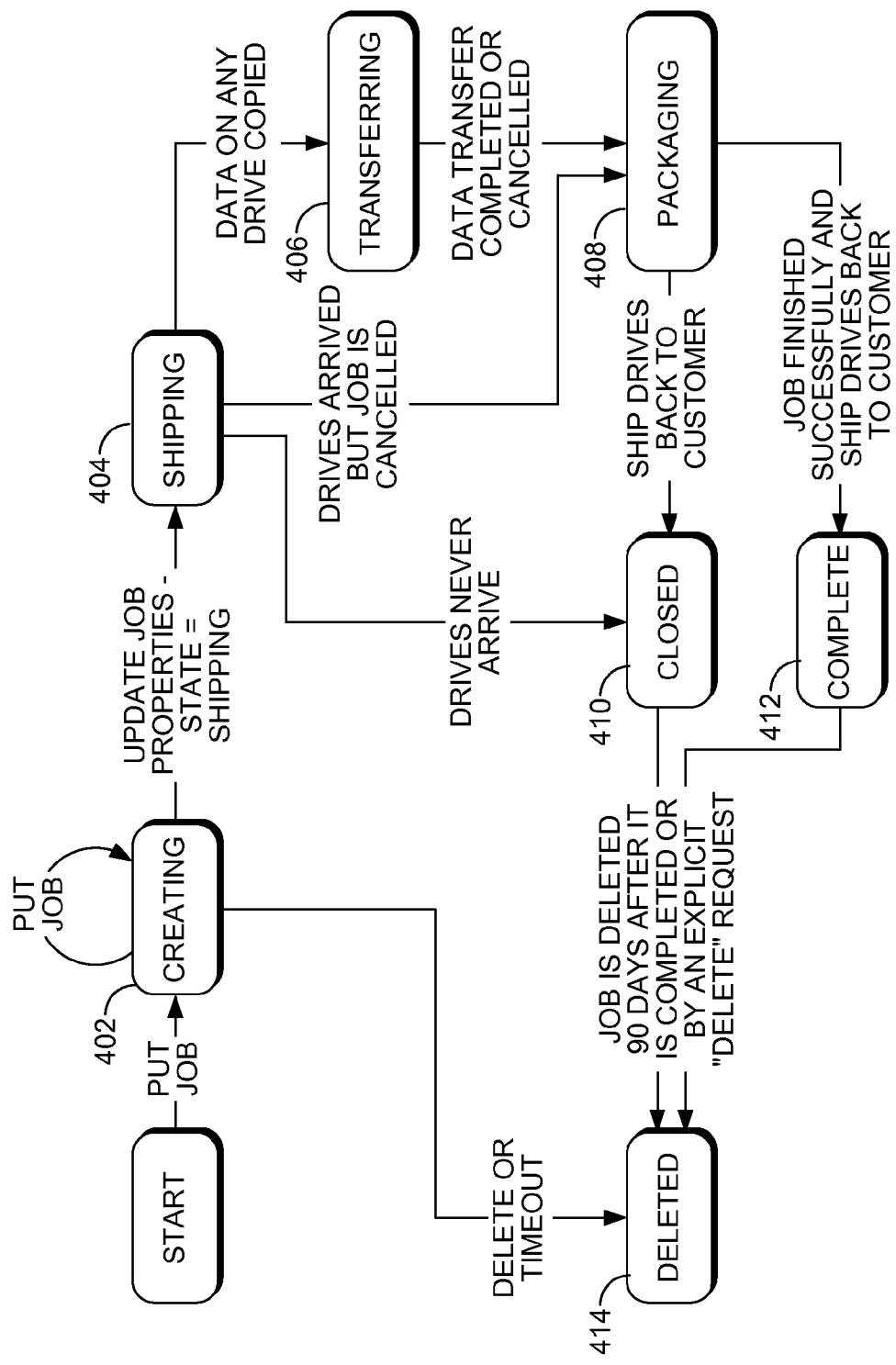
FIG. 4 is a schematic diagram showing an exemplary external logical states that a data transfer job transitions, with embodiments of the present invention.

With reference to FIG. 4, the diagram depicts the states that a job transitions through during a data transfer process. It is contemplated the data transfer client component 204, the client-service interface in particular, may be configured to facilitate retrieving information about data transfer jobs. The information can include the current status of the job, the approximate percentage the each job has been completed, the current states of each drive, and URIs for data containing log objects with errors in accordance with embodiments of the present invention. Upon receiving an operation to generate a data transfer job, the data transfer job can be created and placed in the creating 402 state. While in the creating 402 state, the data transfer service can assume the drive has not been shipped to the storage service infrastructure. An import or export job may remain in the creating 402 state for up to a predefined period of time before it is automatically deleted by data transfer service. If an operation to update the properties of the job is received while the job is in the creating 402 state, the job will remain in the creating 402 state while resetting the timeout to a predefined time period.

The data transfer job can transition into the shipping 404 state based on an update to a state property using an update operation. The shipping 404 state may be set when package information (e.g., carrier and tracking number) have been set. The job can remain in the shipping 404 state for a predefined period of time, after the predefined period of time expires and the drive has not been received, the data transfer service and the storage service administrators can be informed.

Upon the drive arriving at the storage infrastructure and at least one drive having begun processing by the data transfer service, the job state can be changed to a transferring 406 state. Further, upon the drive having completed transferring data, the job can be placed in a packaging 408 state until the storage media are shipped back to the customer. It is contemplated that a job can be cancelled at certain states. A cancelled job will skip the data copy step, but otherwise it will follow the same state transitions as a job that was not cancelled A data transfer job state may be changed to closed 410 to indicate that there is an exception, warning or error. For example, the drive completed with errors, or the number of drives was not sufficient for export. Customers can look for more details in the using the data transfer client component. Customers may also perform repair actions or create a new data transfer job, in accordance with embodiments of the present invention, to address any errors with the data transfer job. The data transfer job state complete 412 indicates that the job has finished normally. The data transfer job in the closed 410 or completed 412 state may be changed to a deleted 414 state. In particular, the data transfer job may be deleted after a predefined period of time or based on an explicit operation to delete the data transfer job.

During shipping 404 sate, the package for a job may not have arrived during a predefined time. The storage service administrators can notify the customer about the missing package. Based on feedback, the time to wait for the package to arrive may be extended or the data transfer job can be cancelled. In the event that the customer cannot be contacted or does not respond within a predefined period, the storage service administrators can initiate actions to move the job from the shipping 404 state directly to the closed 410 state.

During a closed 410 state or a completed 412 state, the drive may not have reached the return address or may have been damaged during shipment in an export job. If the drive does not reach the return address, the customer can first use the data transfer client component to check the job status to ensure the drive has been shipped. If the drive has been shipped, then the customer can contact the shipping provider to try and locate the drive. If the drive is damaged during shipment, the customer can request another export job or download missing data directly from the storage service infrastructure.

During a transferring 408 or packaging 408 state, if the data transfer job has an incorrect or missing return address, the storage service administrators can reach out to the contact person of the job to obtain the correct address. In the event that the customer cannot be reached, the storage media can be securely destroyed within a predefined period of time.

During a creating 402, shipping 404 state, or transferring 406 state if an additional drive that is not listed in the list of drives to be imported is in the shipping package, the extra drive may not be processed and can be shipped back when the job is completed.

During a data transfer job, several errors may occur. Errors may be associated with particular job states and triggered by events. The job state machine may define resolutions and or next steps for handling errors. By way of example, during a creating/undefined state one or more drives may arrive even though the job is not in the shipping state or there is no record of the job in the data transfer service. The storage service administrator can attempt to contact the customer as needed to create or update the job with necessary information to move the job forward. If the storage administrator is unable to contact the customer within a predefined period of time, the storage service administrator will attempt to return the drives. In the event that the drives cannot be returned and the customer cannot be reached, the drives will be securely destroyed in a predefined period of time. A job may not be processed until it enters the shipping state.

Figure 5A:
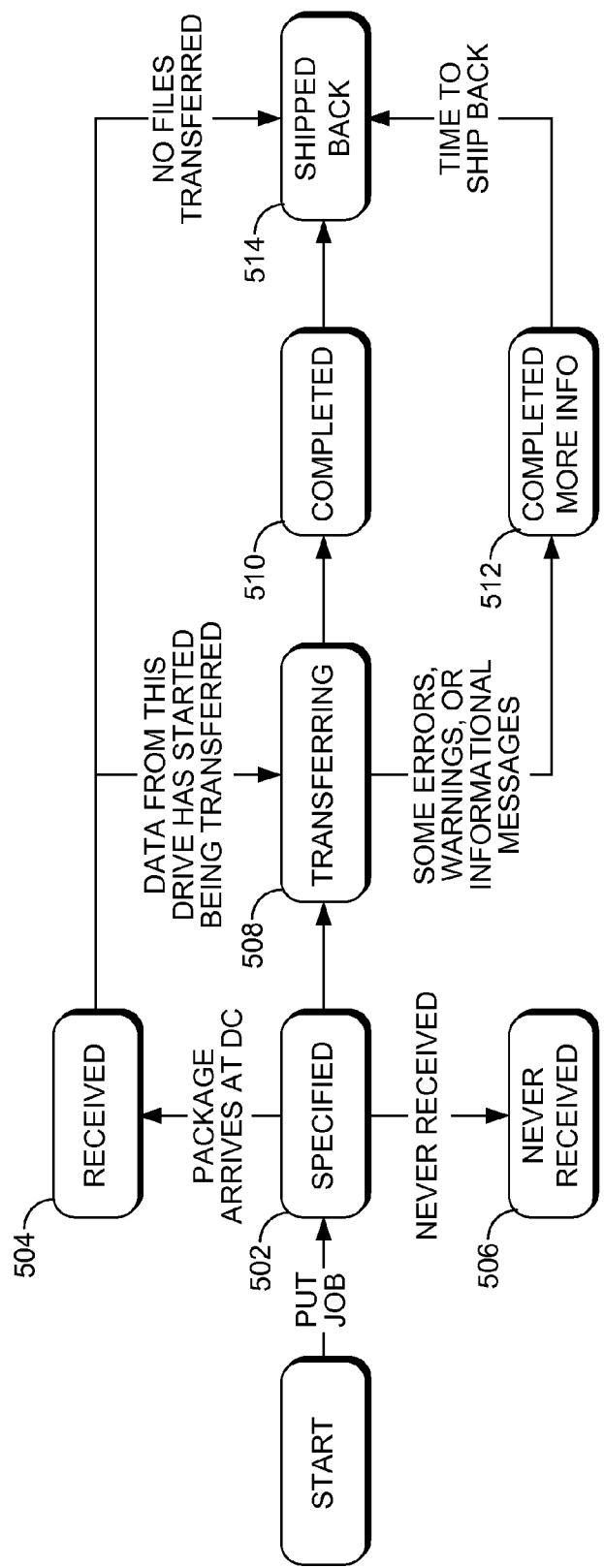
FIG. 5A is a schematic diagram showing exemplary external logical states that a storage medium transitions, in accordance with embodiments of the present invention.
Figure 5B:
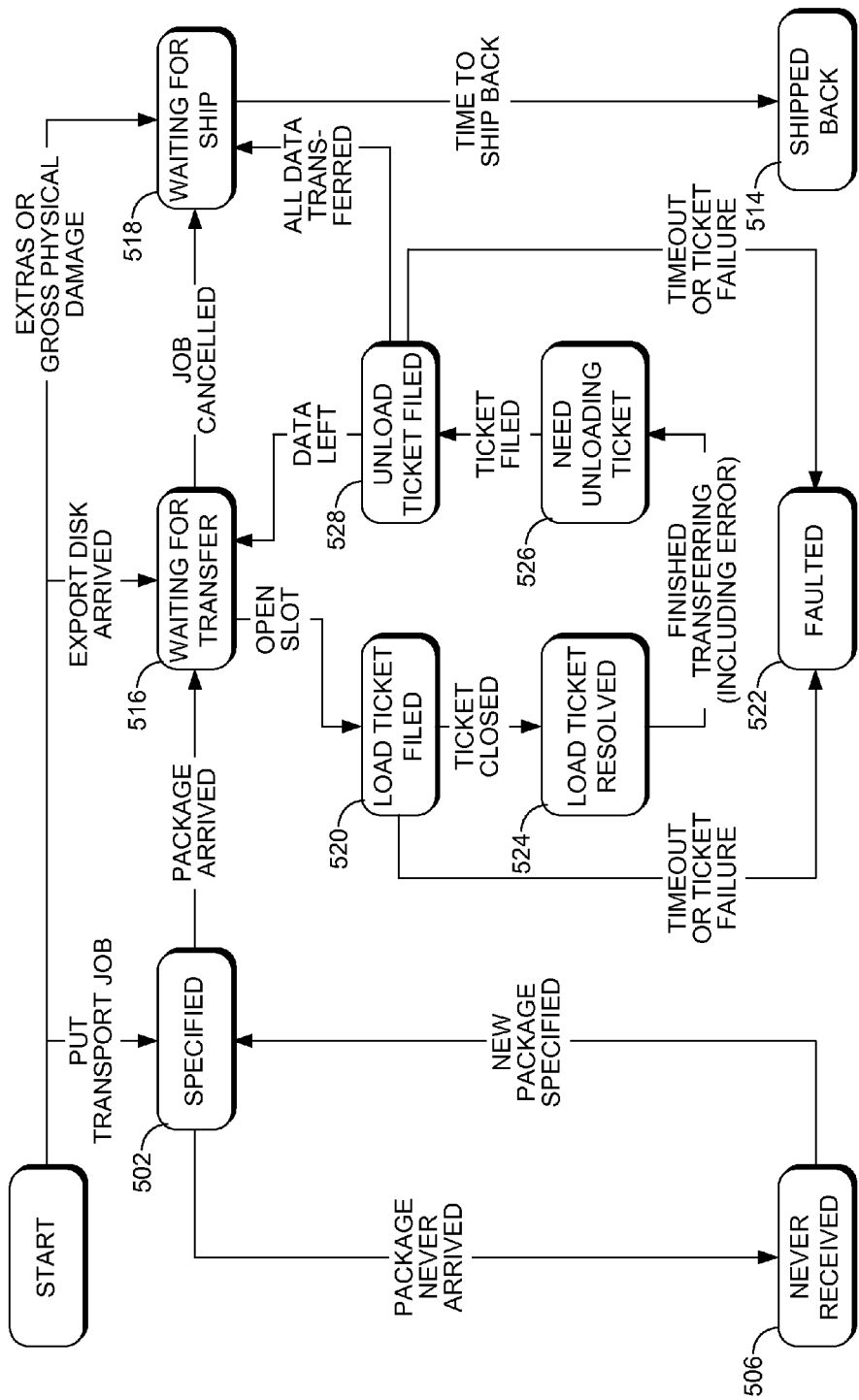
FIG. 5B is a schematic diagram showing exemplary internal logical states that a storage medium transitions, in accordance with embodiments of the present invention.

With reference to FIGS. 5A-B, the diagrams depict the states that a drive transitions through during a data transfer process. The storage service can support an operation to retrieve a current state of the drive. A drive state can be a specified 502 state for an import job, when the job is created using a data transfer service operation. For an export job, since no drive is specified when the job is created, the drive can start with a received 504 state. As such, an import job can transition to a received 504 state when the storage service administrator has processed the drive that id received from the shipping company. Again, specifically for an export job, the drive can start with the received 504 state. A drive state may be a never received 506 state when the package for a data transfer job arrives but the package does not contain the drives. A drive may also move into the never received 506 state when it has been over a predefined period of time since the shipping information of the drive was received but the package has not yet arrived at the storage service infrastructure.

A drive can also move to a transferring 508 state when the data transfer service first starts to transfer from the drive to the storage service infrastructure. The drive state may be moved to a completed state 510 when the data transfer service has successfully transferred all the data with no errors, and a complete more info 512 state when a drive has encountered some issues while copying data either from or to the drive. The info may refer to errors, warnings, or informational messages about overwriting data. The drive can be moved to a shipped back 514 state when it has been shipped from the storage service infrastructure back to the return address.

When a drive in an import job has been added using an operation at the client-service interface, the drive can be in the specified 502 state. When the drive appears at a storage service infrastructure as the result of a storage service administrator closing a ticket to receive goods, the data transfer management component transfers the drive to the waiting for transfer 516 state. When the drive cannot possibly arrive, due to no outstanding tracking numbers, the data transfer management component transfers the drive to the never received 506 state.

When a drive in a data transfer job is in the waiting for transfer 516 state, the drive can be sitting in a bin at the storage service infrastructure waiting to be loaded into a drive bay so that transfer may either begin or continue. When a drive enters the waiting for transfer 516 state, the drive may be assigned a timestamp. Based on this timestamp, and other rules governing insertion and removal of drives, the data transfer management component can write a ticket for a storage service administrator to insert the disk into a specific drive bay and transitions the drive to the load ticket filed 520 state.

The drive can be in the load ticket filed 520 state when a ticket has been filed to load the disk into a specific a drive bay, and an appropriate action has been perform to enable communication between the corresponding job, drive, ticket, and drive bay. If the ticket is overdue, or is failed, the drive can be moved to the faulted state 522 and an incident is raised. If the ticket is closed, the drive can be transferred into a load ticket resolved 524 state.

When the storage service administrator performs a loading task, the agent on the drive bay can detect the drive insertion and assign the drive to a VM, as described in embodiments of the present invention. The VM communicates with the data transfer management component to get information about the storage account used for the disk. Once the data transfer management component responds as to which job the drive insertion is for, and receives confirmation that the mount was successful, it changes the drive state to transfer 508 in progress. If the mount is unsuccessful, the data transfer management component files a ticket to remove the drive from the drive bay. When this is complete, the drive can be moved to a need unloading ticket 526 and upon the ticket being filed, to the unload ticket filed 528 state.

When a drive in a data transfer job is in the transferring 508 state, it has been loaded into a drive bay, a VM has been allocated, and files are being uploaded to the storage service infrastructure. The data transfer management component is responsible for making this state transition, based on the information the VM provides it. It is contemplated that the data transfer management component may further support restarting, resetting, or monitoring as needed for the VM as it transfers. If copy completes, or if it fails irretrievably, or on a timeout due to no progress, the data transfer management component can file a ticket to remove the drive from the drive bay. When this is complete, the drive is moved to the unload ticket filed 526 state.

When a drive in a data transfer job is in the unload ticket filed 526 state, it has successfully been loaded into a rack, and is now ready to be removed from that rack. A ticket is outstanding for a storage service administrator to perform that removal. If the ticket is overdue or failed, the data transfer management component moves the drive to the faulted 522 state and an incident is raised. If the ticket is closed, the drive still has data to transfer, and forward progress was made on this run, the data transfer management component can move the drive to the waiting for transfer 516 state. If the ticket is closed otherwise, the data transfer management component can move the disk to the waiting for ship 518 state, since the drive cannot make forward progress When a drive in a data transfer job is in the waiting for ship 518 state, the drive is ready to be shipped back to the customer. When all drives from a bin are in the waiting for ship 518 state, the data transfer management component files a ticket to return the drives to the customer. This can be part of the package workflow.

When a drive in a data transfer job is in the shipped back 514 state, a storage service administrator has closed a ticket indicating that it has been successfully returned to the user, using a certain tracking number. The data transfer management component may take no action on the drive in this state. It is contemplated that interaction with the carrier could be incorporated to monitoring to help determine whether the customer has actually received the package. When all drives involved in the data transfer job are in the shipped back state 514, the job is in the completed state.

When a drive in a data transfer job is in the never received 506 state, either one of these two conditions can be true—all outstanding tracking numbers are over their timeouts and all tracking numbers have been received, but a drive listed in the import drive list has not been received within them. The data transfer management component can move a drive back to the specified 502 state if the user specifies a new tracking number using the client-service interface.

The data transfer service can also support several different fault states. When a data transfer job or storage medium fails to progress normally through its expected life cycle, the job or storage medium can be moved into a faulted state. At that point, the storage service administrator can contact the customer (e.g., by email or phone). Once the issue is resolved, the faulted job or drive can be taken out of the faulted state and moved into the appropriate state. When a drive in a data transfer job is in the faulted state, something has gone wrong and storage service administer may address any issues. The data transfer management component may take no action on the drive in this state. However, the storage service administrator can modify the state of the drive to allow all appropriate actions. In embodiments, a fault is implemented as a flag such that the job or drive stays in its current state but then marked as faulted. The fault flag may be a separate field associated with the job or drive. As such, the fault flag remains active and the job or drive is frozen in an associated state until the issue is resolved.

Data transfer service may further support cancelling, deleting, enumerating jobs. Each of these actions may be associated with an operation executable at the client-service interface. A customer may perform an operation via the client-service interface to configure the data transfer job during different logical states of the data transfer job. For example, a customer may request to cancel a data transfer job before the data transfer job is in a packaging state by executing a cancel operation. The cancellation can be done on a best effort basis, and if storage media are in the process of transferring data, more data may be transferred even after the cancel has been requested. A cancelled job may still run to the completed state and be kept for a predefined period of time, at which point it will be deleted. A customer may further execute a delete operation before the storage medium has been shipped (while the data transfer job is in the creating state). A data transfer job can also be deleted when the data transfer job is in the closed or complete state. After a data transfer job has been deleted, its information and status may not be accessible using the data transfer service. A customer can also enumerate the data transfer service jobs in a subscription by executing an enumeration operation. The operation can return the data transfer jobs including on the following attributes: type of job (Import or Export), current job state, job's associated storage account, and time the job was created.

Figure 6:
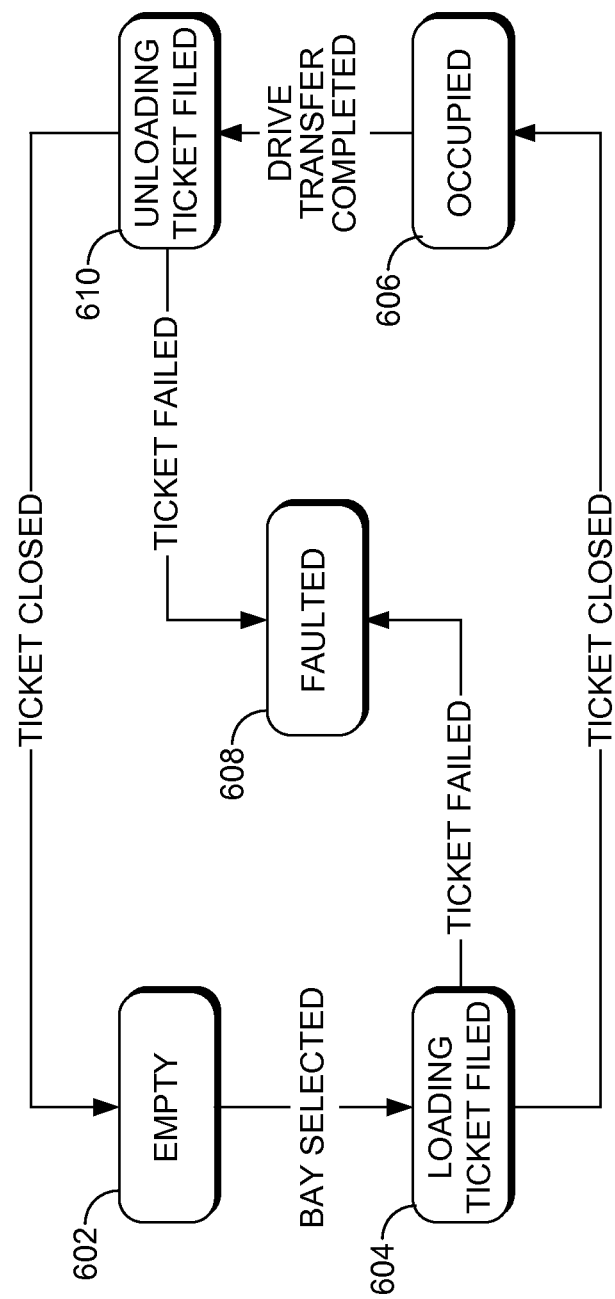
FIG. 6 is a schematic diagram showing exemplary logical states that a drive bay transitions, in accordance with embodiments of the present invention.

With reference to FIG. 6, the diagram depicts the states that a drive bay transitions through during a data transfer process. The drive bay may be configured to receive a drive and facilitate importing or exporting the data on the drive. The drive bay may support several different logical states. The drive bay can be in an empty 602 state initially, as well as upon successful closure of an unloading ticket. If the management component selects the drive bay for transferring activity, the management component can file a ticket to load a drive into the bay and move the bay to the loading ticket filed 604 state. During the loading ticket filed 604 state there exists an outstanding ticket for a storage service administrator to load a drive into the drive bay. If the ticket is closed successfully, the data transfer management component moves the drive bay to the occupied 606 state. If the ticket is failed for some reason, the data transfer management component can move the drive bay to the faulted 608 state. The drive bay is in the occupied 606 state while there is a drive doing copying work inserted. When that drive is moved to the unload ticket filed 610 state by the data transfer management component, so is the drive bay.

During the unloading ticket filed 610 state a drive can be inserted in the drive bay, but a ticket is outstanding to remove the drive from this drive bay. If the ticket is closed successfully, the data transfer management component moves the drive bay to the empty 602 state. If the ticket is failed for some reason, the data transfer management component moves the drive bay to the faulted 608 state. The drive can be in a faulted 608 state when either a load or an unload ticket is failed for some reason. Human intervention can be needed to move the drive bay back to empty 602 state. The data transfer management component may take no action on the drive bay in this state. However, humans can modify the drive bay state to note that it has been repaired.

Figure 7:
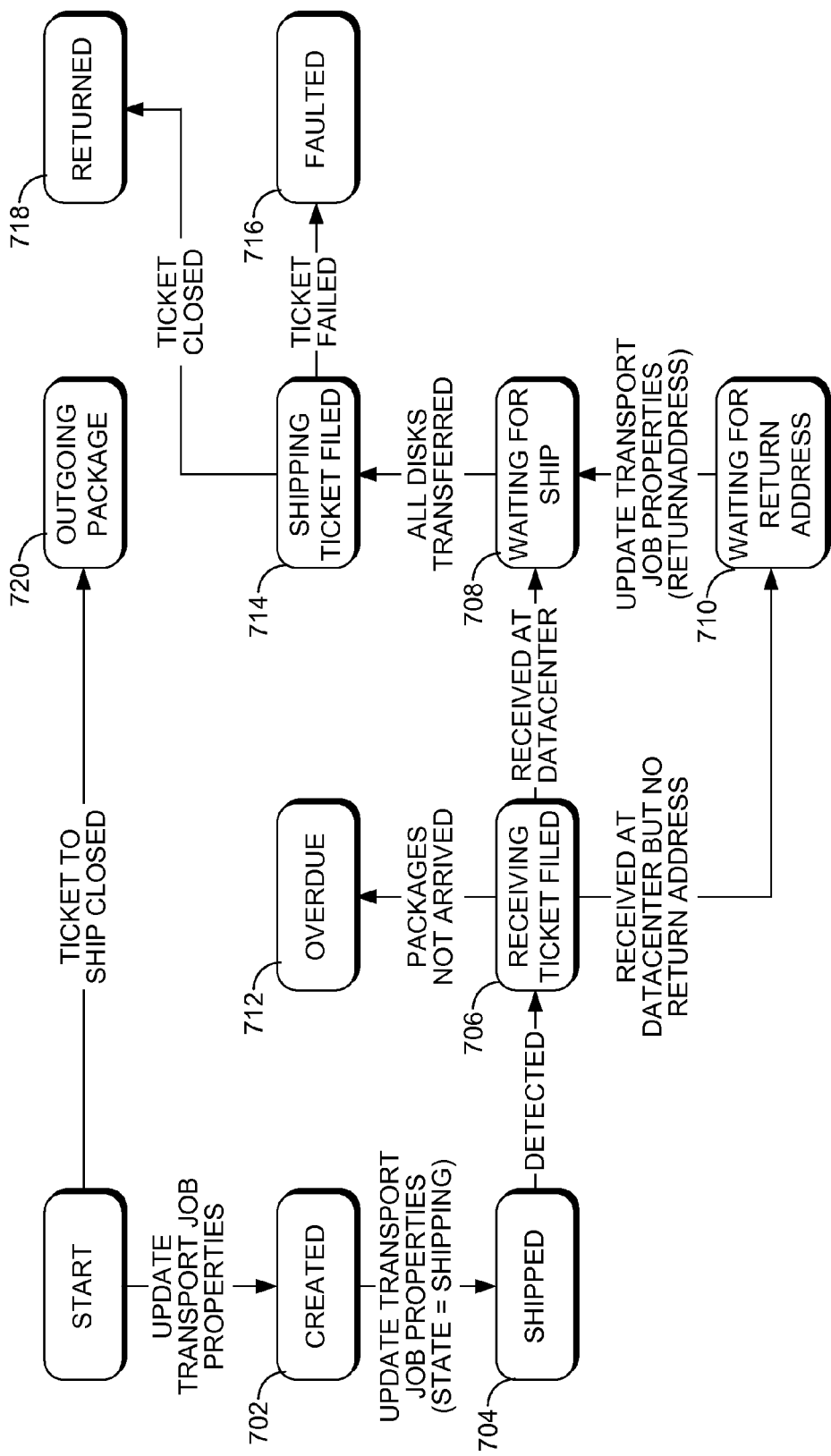
FIG. 7 is a schematic diagram showing exemplary logical states that a package transitions, in accordance with embodiments of the present invention.

With reference to FIG. 7, package information (e.g., carrier and tracking number) can be provided by the customer through the client-service interface. For each tracking number associated with package information, the data transfer management component can file a ticket to receive the incoming package. Package entities go through various as listed in the FIG. 7. The package can be in the created 702 state when the package has been specified by an operation on client-service interface to update the data transfer job with the package information. The data transfer management component may take no action on tickets in this state. The package can be in the shipped 704 state when the customer sets the state of the data transfer job, the package can be associated with shipping. The data transfer management component can move the ticket to a shipped 704 state. As soon as the data transfer management component sees a ticket in this state, it can file a ticket to receive the tracking numbers at the appropriate storage service infrastructure, and move the state to receiving ticket filed 706. The package can be in the receiving ticket filed 706 state after the data management component sets the state of the tracking number to shipped and filed a ticket to receive the package at the storage service infrastructure. At this point, the tracking number can fundamentally be a ticket.

The data transfer management component can be responsible for monitoring the state of this ticket while the package is in the receiving ticket filed 706 state. If the storage service administrator closes the ticket, the ticket can have appropriate details about which drives were contained in the shipment. The data transfer management component can move the state on all the drives named in the ticket to the waiting for transfer state. Upon closure, if the associated data transfer job has a return address associated therewith, the data transfer management component can move the package to the waiting for ship 708 state. Otherwise, the data transfer management component can move the package to the waiting for return address 710 state. The package can be in the waiting for return address 710 state when it has been received at storage service infrastructure, but no return address is specified in the associated job. The data transfer management component can move the state of the package to waiting for ship 708 when the customer updates the return address. The data transfer management component may take no action on packages in this state. If the ticket is overdue, the data transfer management component can move the package to the overdue 712 state.

The package can be in the waiting for ship 708 state when the drive has been loaded into a bin at the storage service infrastructure. In addition, there is the necessary information needed to be able to return the drive to the customer. The data transfer management component is responsible for filing tickets for all drives in this bin to be loaded and unloaded from the bin. When all drives from this bin are in the waiting for ship 708 state, the data transfer management component can move the package to the shipping ticket filed 714 state upon successfully filing a ticket to ship the drives back.

The package can be the shipping ticket filed 714 state when the data transfer management component has filed a ticket to ship the drives in the bin back to the customer. If the ticket is overdue or failed, the package can be moved to the faulted 716 state. If a storage service administrator closes the ticket, the ticket will have appropriate details about the tracking numbers used to ship the drives back to the customer. The data transfer management component can move all the relevant drives to the shipped back state, then moves the package to the returned 718 state.

The package can be in the returned 718 state when the ticket to ship the drives is closed, giving the information about which packages were used to ship the drives to the customer. Note that the data transfer management component will create a new package entity for each tracking number listed in the ticket. Each of these entities will be in the outgoing package 718 state. The data transfer management component takes no action on tracking numbers in this state. The package is in the outgoing package 720 state when a storage service administrator mentions it when closing a return shipping ticket. The data transfer management component may take no action on tracking numbers in this state. The data transfer management component returns the tracking numbers of these tickets. The package can be overdue 712 or faulted 716 when a receiving ticket is open past its timeout or has failed in some way, respectively. The data transfer management component may take no action on tracking numbers in this state.

Figure 8:
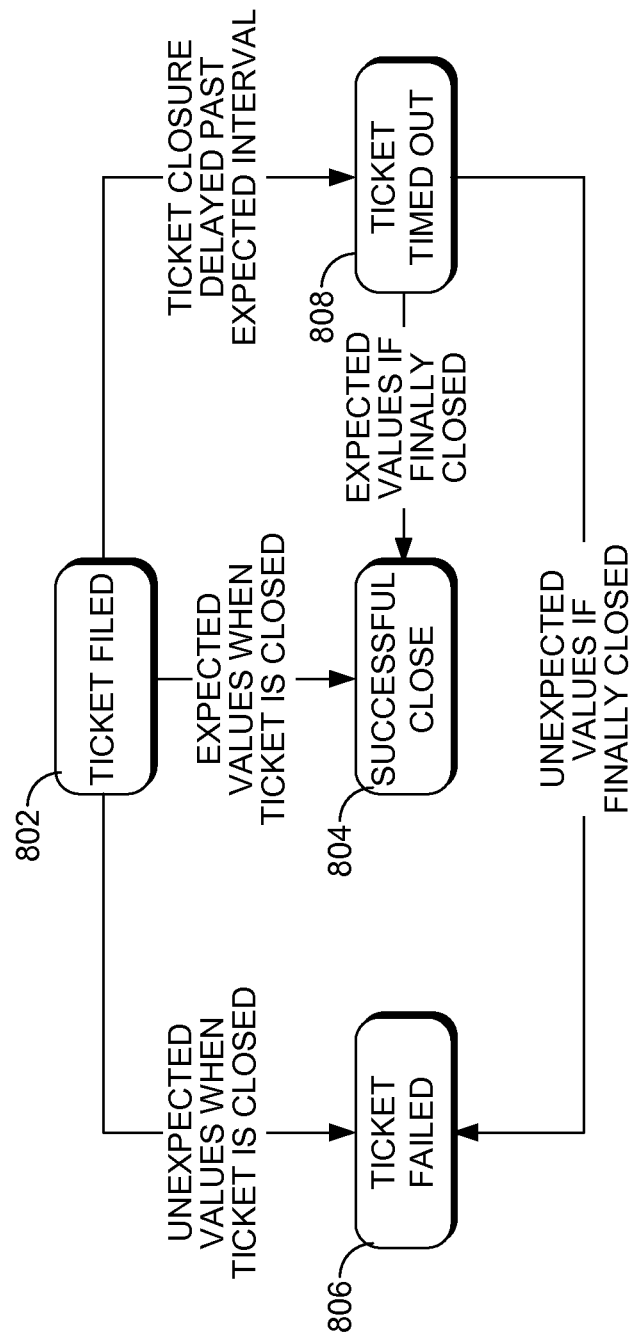
FIG. 8 is a schematic diagram showing exemplary logical states that a ticket transitions, in accordance with embodiments of the present invention.

With reference to FIG. 8, the diagram depicts the states that a ticket transitions through during a data transfer process. When a drive is inserted or removed from a drive bay a loading ticket is created in a ticket filed 802 state. Upon ticket closure, the data transfer management component can move the loading ticket to either the successful close 804 state or the ticket failed 806 state, depending on the contents of the ticket reply. Upon ticket timeout, the data transfer management component moves the ticket to the ticket timed out 808 state.

A loading ticket can be in the ticket failed 806 state when the contents of the ticket upon closure are unexpected (bay does not exist, bay is inoperable, etc.). The data transfer management component may not modify the state of the loading ticket when in this state. However, human intervention can move the ticket from this state to some other. A loading ticket is in the successful close 804 state when the underlying ticket is closed and the contents upon closure are expected. The data transfer management component may not modify the state of this loading ticket further. A loading ticket can be in the ticket timed out 808 state when the underlying ticket has not been serviced in a timely fashion. The data transfer management component does, however, continue to monitor the state of the underlying ticket.

Embodiments of the different data transfer artifacts and logical states associated therewith have been described in relation to particular embodiments which are intended in all respects to be illustrative rather than restrictive. Alternative embodiments will become apparent to those of ordinary skill in the art to which the present invention pertains without departing from its scope.

Figure 9:
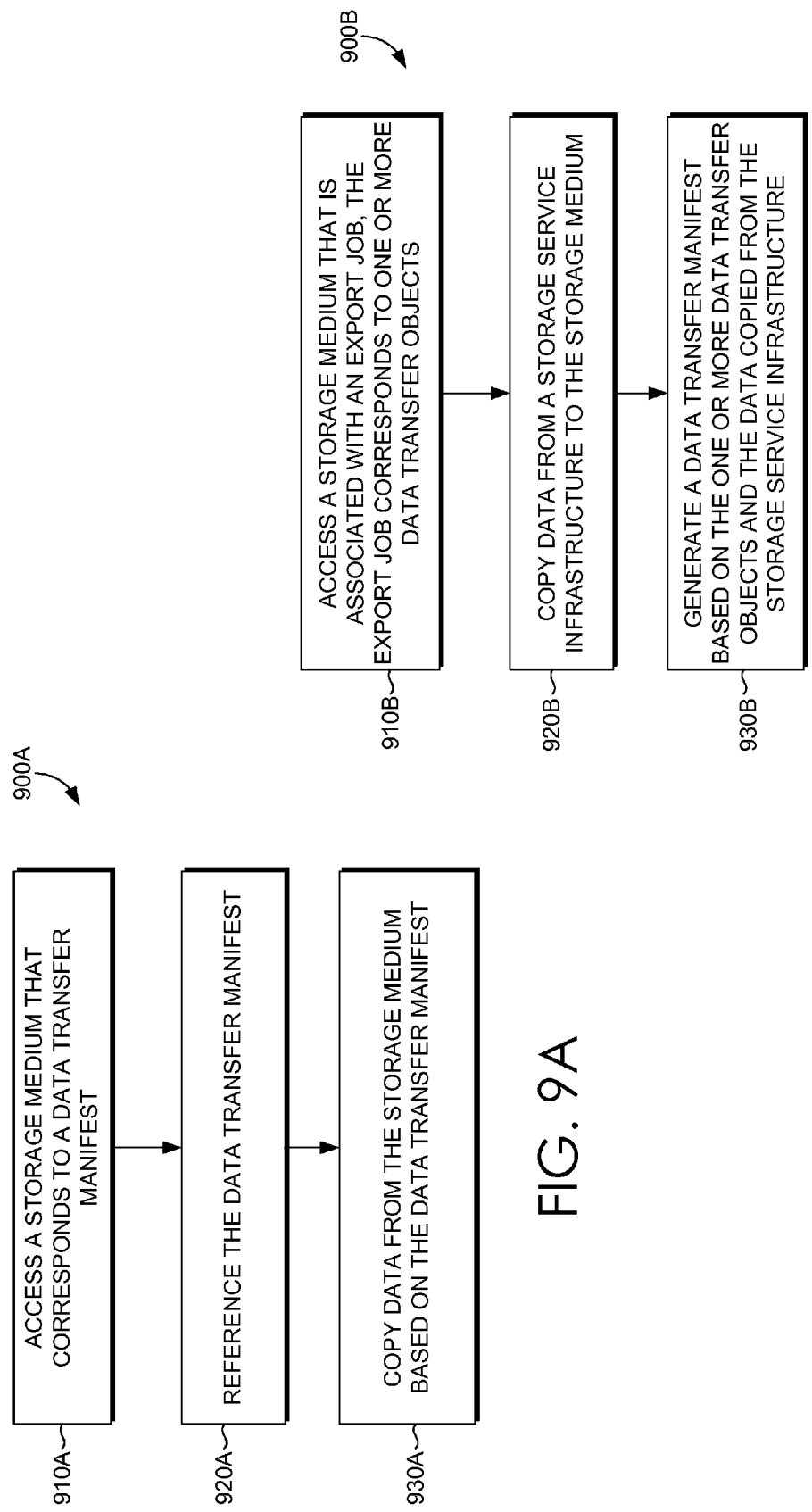
FIG. 9A is a flow diagram showing a method for importing data to a storage service infrastructure, in accordance with embodiments of the present invention.
FIG. 9B is a flow diagram showing a method for exporting data from a storage service infrastructure, in accordance with embodiments of the present invention.

Turning now to FIG. 9A, a flow diagram is provided that illustrates a method 900A for importing data on storage media. Initially at block 910A, a storage medium is accessed. The storage medium corresponds to a data transfer manifest. The storage medium is associated with an import job. The data transfer manifest may be stored in the storage medium or communicated and stored in the storage service infrastructure. The storage medium can be configured using a data transfer client component. The data transfer client component facilitates generating the data transfer manifest, the data transfer manifest may include data transfer objects including at least one or more of a location object, an authentication security object, an encryption security object, validation object, and a hash security object. A portion of the storage medium may secured using the hash security object such that the integrity of the portion of the storage medium is verified prior to providing the storage medium for data transfer processing.

At block 920A, the data transfer manifest is referenced. The data transfer manifest at least provides data mapping between the storage service infrastructure and the data in the storage medium. At block 930A, data is copied from the storage medium to the storage service infrastructure based on the data transfer manifest. In embodiments, a log object may be generated while copying the data from the storage medium to the storage service infrastructure. The log object comprises at least in part, a data event error associated with the data processed from the storage medium. The log object provides for repairing the data associated with the data error event using alternate data from an identified location.

Turning now to FIG. 9B, a flow diagram is provided that illustrates a method 900B for exporting data onto storage media. Initially at block 910B, a storage medium is accessed. The storage medium is associated with an export job. The export job corresponds to one or more data transfer objects. The export job can be created using a data transfer client component. At block 920B, data from a storage service infrastructure is copied to the storage medium. At block 930B, a data transfer manifest is generated based on the one or more data transfer objects and the data copied from the storage service infrastructure. The data transfer manifest corresponds to the storage medium. In embodiments, the data transfer manifest is stored on the storage medium. In alternate embodiments, the data transfer manifest is stored in the storage service infrastructure. The method further comprises generating a log object for data. The log object comprises at least in part, a data error event associated with the data processed from the storage medium. The log object provides for repairing the data associated with the data error event.

Figure 10:
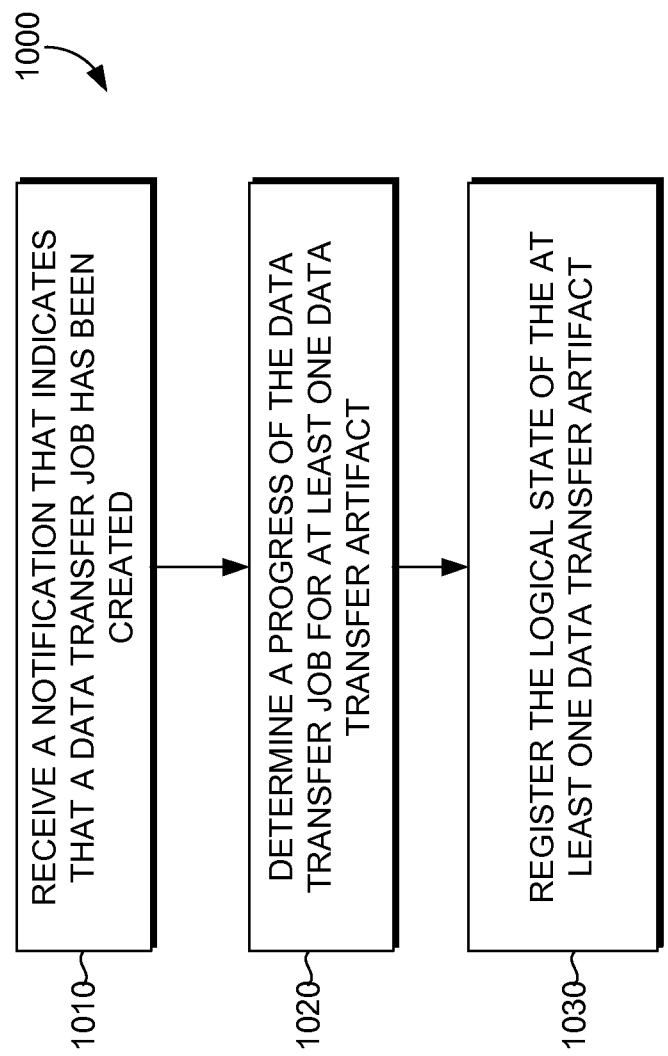
FIG. 10 is a flow diagram showing a method for registering logical states of data transfer artifacts, in accordance with embodiments of the present invention.

Turning now to FIG. 10, a flow diagram is provided that illustrates a method 1000 for monitoring data transfer for storage media. Initially at block 1010, a notification is received that indicates that a data transfer job has been created. The data transfer job is created at least in part using a data transfer client component. At block 1020, the progress of the data transfer job is determined for at least on data transfer artifact. The at least one data transfer artifact is associated with a logical state based on the progress on the data transfer job. The at least one data transfer artifact is selected from the following: a job, a storage medium, a storage medium bay, a package, a ticket, and a health of the storage medium, storage medium bay, and the ticket. The health may refer to a status designation (e.g., good or bad, healthy or unhealthy, or 1-5) that indicates the condition a selected data transfer artifact in relation to the data transfer job progress. For example, if a ticket is addressed during a predefined period of time the health of designation can be good; however if a ticket is not addressed during the predefined period of time, the ticket can be associated with a bad status designation. The status designations of the health of a data artifact can improve the advancement of storage media through the data transfer process.

At block 1030, the logical state of the at least on data transfer artifact is registered. In embodiments, additional information associated with the data transfer job can be received, and the progress of the data transfer job is determined based on receiving the additional information such that the logical state is updated. The logical state can further be registered in associated with a designated entity, where the designated entity is a customer entity or a storage service administrator entity.

Figure 11:
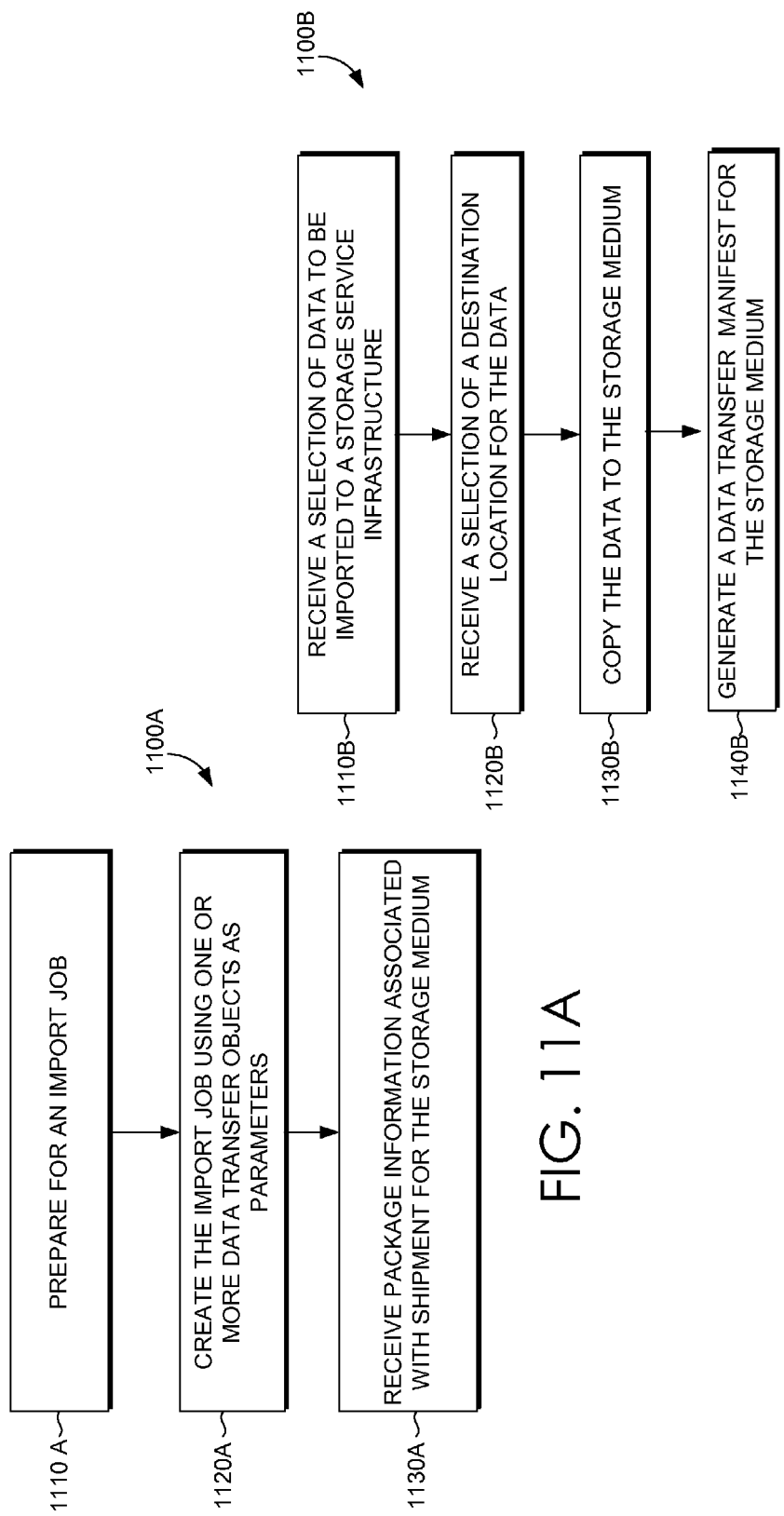
FIG. 11A is a flow diagram showing a method for importing data to a storage service infrastructure, in accordance with embodiments of the present invention.
FIG. 11B is a flow diagram showing a method for preparing a storage medium for an import job, in accordance with embodiments of the present invention.

Turning now to FIG. 11A, a flow diagram is provided that illustrates a method 1100A for importing data based on storage media. Initially at block 1110A, an import job is prepared for. Preparing for the import job includes a plurality of operations. At block 1120A, the import job is created using one or more data transfer objects as parameters. At block 1130A, package information is received for the storage medium. The package information is associated with a shipment of the storage medium.

Turning now to FIG. 11B, a flow diagram is provided that illustrates a method 1100B for preparing for an import job. Initially at block 1110B, a selection of data to be imported to a storage service infrastructure is received. At block 1120B, a selection of a destination location for the data is received. At block 1130B, the data is copied to the storage medium. At block 1140B, a data transfer manifest is generated for the storage medium. The data transfer manifest is stored on the storage medium such that data on the storage medium is copied from the storage medium by referencing the data transfer manifest.

Figure 12:
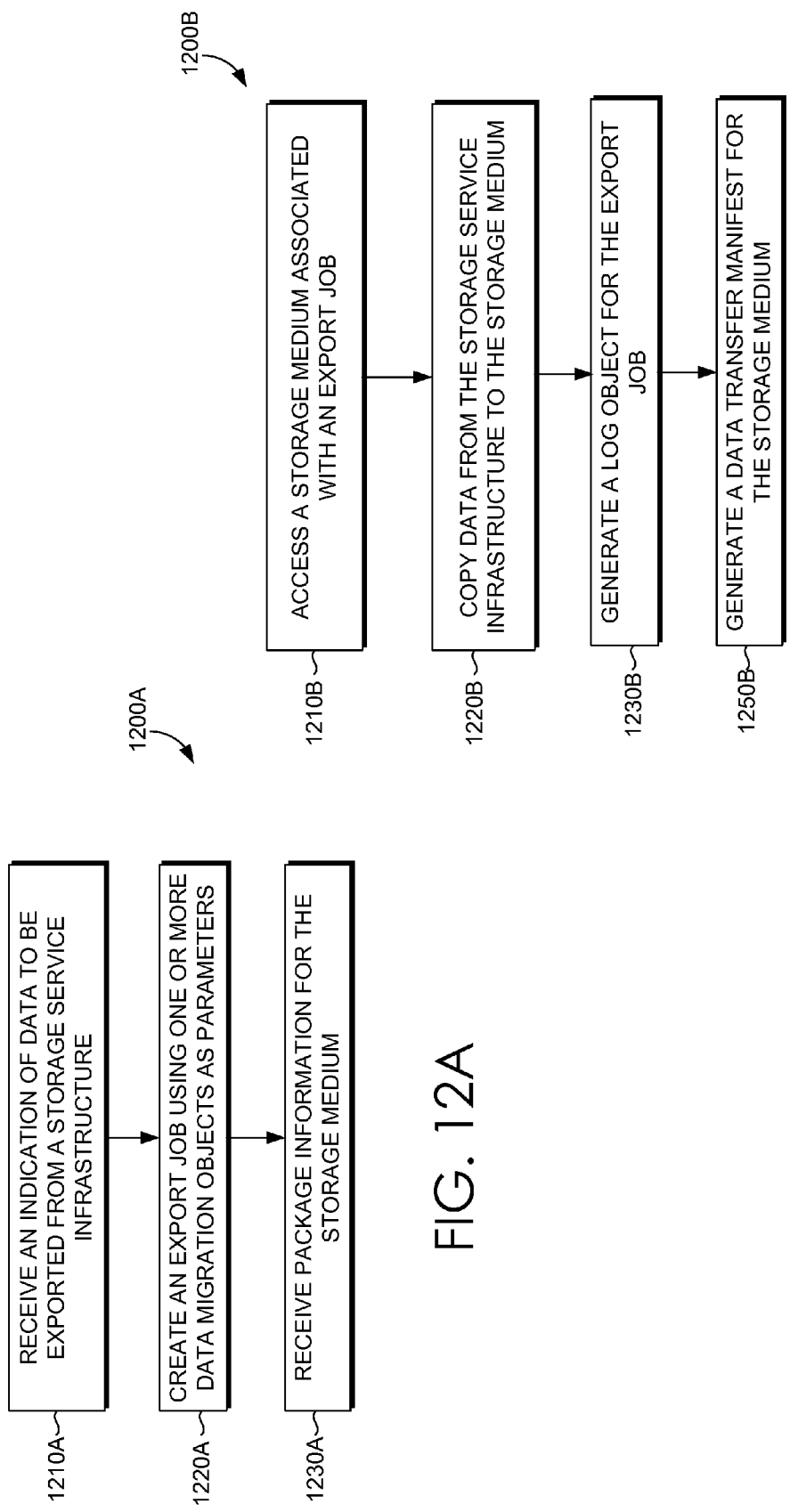
FIG. 12A is a flow diagram showing a method for preparing a storage medium for an export job, in accordance with embodiments of the present invention.
FIG. 12B is a flow diagram showing a method for exporting data from a storage service infrastructure, in accordance with embodiments of the present invention.

Turning now to FIG. 12A, a flow diagram is provided that illustrates a method 1200A for preparing for an export job. Initially at block 1210A, an indication of data to be exported from a storage service infrastructure is received. At block 1220B, an export job is created using one or more data transfer objects as parameters. At block 1230B, package information is received for the storage medium. The package information is associated with a shipment of the storage medium.

Turning now to FIG. 12B, a flow diagram is provided that illustrates a method 1200B for exporting data on storage media. Initially at block 1210B, a storage medium is accessed. The storage medium is associated with an export job. The export job is configured using a plurality of operations. At block 1220B, data is copied from the storage service infrastructure to the storage medium. At block 1230B, a log object is generated for the export job. At block 1240A, a data transfer manifest is generated for the storage medium. The data transfer manifest is stored on the storage medium such that the data on the storage medium is copied from the storage medium by referencing the data transfer manifest.

Figure 13:
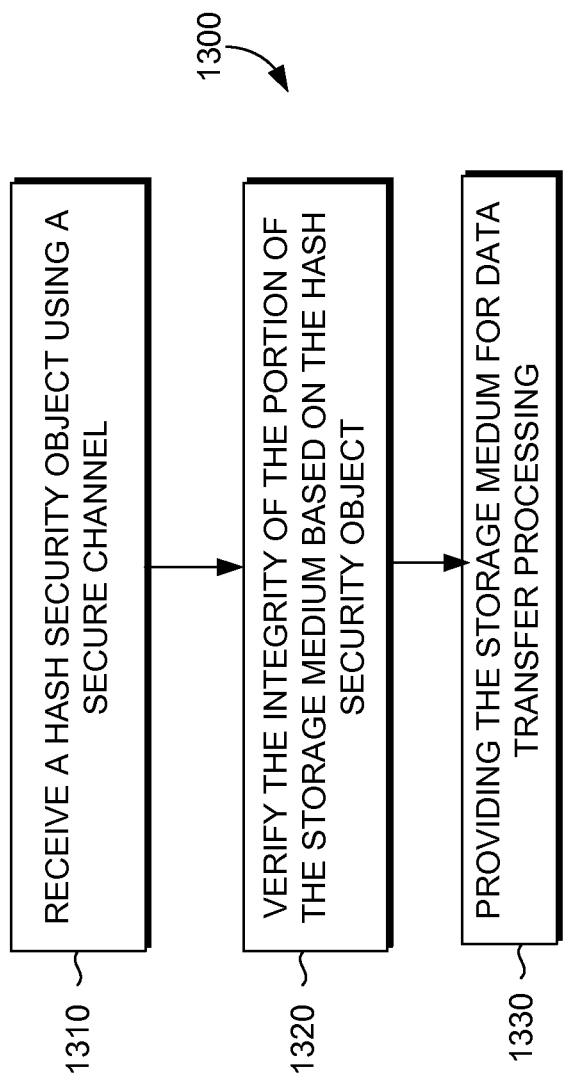
FIG. 13 is a flow diagram showing a method for verifying storage media for data transfer jobs, in accordance with embodiments of the present invention.

Turning now to FIG. 13, a flow diagram is provided that illustrates a method 1300 for verifying storage media for data transfer. Initially at block 1310, a hash security object is received using a secure channel. The hash security object secures a portion of the storage medium that facilitates access to the data on the storage medium. At block 1320, the integrity of the portion of the storage medium is verified based on the hash security object. At block 1330, upon verifying the integrity of the portion of the storage medium, the storage medium is provided for data transfer processing. It is contemplated that the storage medium is processed via a dedicated virtual machine that is securely segregated from the storage service infrastructure.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media storing computer-useable instructions that, when executed by one or more processors, cause the one or more processors to perform a method for importing data on storage media, the method comprising:
   accessing a storage medium, wherein the storage medium corresponds to a data transfer manifest, and wherein the storage medium is associated with an import job;
   referencing the data transfer manifest, wherein the data transfer manifest at least provides data mapping between storage service infrastructure and data in the storage medium;
   copying data from the storage medium to the storage service infrastructure, based on the data transfer manifest; and
   generating a log object for the data, wherein the log object comprises, at least in part, a data error event associated with the data processed from the storage medium, wherein the log object data provides for repairing the data associated with the data error event based on the log object, wherein the data is repaired using repair data retrieved from an identified location.

2. The media of claim 1, wherein the data transfer manifest that corresponds to the storage medium is stored on the storage medium.

3. The media of claim 1, wherein the data transfer manifest that corresponds to the storage medium is stored in a storage service infrastructure.

4. The media of claim 1, wherein the storage medium corresponds with the data transfer manifest configured using a data transfer client component.

5. The media of claim 1, wherein the data transfer manifest further comprises a location object, wherein the location object identifies a destination location in the storage service infrastructure for data from the storage medium.

6. The media of claim 1, wherein the data transfer manifest comprises an authentication security object, wherein the authentication security object authenticates the storage medium with reference to a storage account in the storage service infrastructure.

7. The media of claim 1, wherein the storage medium is associated with an encryption security object that is communicated to the storage service infrastructure using a secure channel, wherein the encryption security object encrypts the data on the storage medium.

8. The media of claim 1, wherein a portion of the storage medium that facilitates access to the data of the storage medium is secured using a hash security object, wherein the hash security object communicated to the storage service infrastructure using a secure channel that is different from a shipment of the storage medium.

9. The media of claim 8, further comprising:
   verifying the integrity of the portion of the storage medium based on the hash security object; and
   upon verifying the integrity of the portion of the storage medium, providing the storage medium for data transfer processing.

10. The media of claim 1, wherein the data transfer manifest comprises a validation object, wherein the validation object facilitates verifying integrity of data copied to the storage medium such that corrupted data are identified as data error events.

11. The media of claim 1, wherein a data transfer job associated with the storage medium is monitored based on:
   receiving a notification that indicates that a data transfer job has been created, wherein the data transfer job is created at least in part using a data transfer client component;
   determining a progress of the data transfer job for at least one data transfer artifact, wherein the at least one data transfer artifact is associated with a logical state based on the progress of the data transfer job; and
   registering the logical state of the at least one data transfer artifact.

12. The media of claim 11, wherein the at least one data transfer artifact is selected from the following:
   a job;
   a storage medium artifact;
   a storage medium bay;
   a package;
   a ticket; and
   a health of the storage medium, the storage medium bay, and the ticket.

13. One or more computer storage media storing computer-useable instructions that, when executed by one or more processors, cause the one or more processors to perform a method for exporting data onto storage media, the method comprising:

accessing a storage medium, wherein the storage medium is associated with an export job, the export job corresponding to one or more data transfer objects;

copying data from a storage service infrastructure to the storage medium; and generating a data transfer manifest based on the one or more data transfer objects and the data copied from the storage service infrastructure, the data transfer manifest corresponds to the storage medium, wherein the data transfer manifest comprises a validation object, wherein the validation object facilitates verifying integrity of data copied to the storage medium such that corrupted data are identified as data error events and repaired from an identified location.

14. The media of claim 13, wherein the export job is created using a data transfer client component.

15. The media of claim 13, wherein the data transfer manifest that corresponds to the storage medium is stored on the storage medium.

16. The media of claim 13, wherein the data transfer manifest that corresponds to the storage medium is stored in the storage service infrastructure.

17. The media of claim 13, wherein the one or more data transfer objects includes an authentication security object, wherein the authentication security object authenticates the storage medium with reference to a storage account in a storage service infrastructure.

18. The media of claim 13, wherein the one or more data transfer objects includes a data object, wherein the data object identifies data in the storage service infrastructure to be transferred to the storage medium.

19. The media of claim 13, wherein the data transfer manifest comprises a validation object, wherein the validation object facilitates verifying integrity of data copied to the storage medium such that corrupted data are identified as data error events.

20. The media of claim 13, further comprising:
generating a log object for the data, wherein the log object comprises, at least in part, a data error event associated with the data processed from the storage medium, wherein the log object data provides for repairing the data associated with the data error event based on the log object, wherein the data is repaired using repair data retrieved from an identified location.

21. A computer-implemented method for monitoring data transfer for storage media, the method comprising:
receiving a notification that indicates that a data transfer job has been created, the data transfer job comprises a storage medium, a customer infrastructure and storage service infrastructure for physically transporting the storage medium there-between, wherein the data transfer job is created at least in part using a data transfer client component, and wherein the storage medium is associated with a hash security object wherein the hash security object selectively secures a master boot record with a boot sector of the storage medium that facilitates access to the data on the storage medium;

determining a progress of the data transfer job for at least one data transfer artifact, wherein the at least one data transfer artifact is associated with a logical state based on the progress of the data transfer job; and registering the logical state of the at least one data transfer artifact.

22. The method of claim 21, wherein the at least one data transfer artifact is selected from the following:
a job;
a storage medium artifact;
a storage medium bay;
a package;
a ticket; and
a health of the storage medium, the storage medium bay, and the ticket.

23. The method of claim 21, further comprising generating a ticket based on the progress of the data transfer job.

24. The method of claim 21, further comprising:
receiving additional information associated with the data transfer job;
determining the progress of the data transfer job based on receiving on the additional information; and
registering the logical state updated based on the progress of the data transfer job.

25. The method of claim 21, wherein the logical state is registered for a designated entity to access, wherein the designated entity includes at least one of:
a customer entity; and
a storage service administrator entity.

26. The method of claim 21, further comprising:
identifying an error event associated with a logical state for the at least one data transfer artifact; and
registering the logical state updated based on a resolution action associated with the error event.

27. A system for importing data from storage media, the system comprising:
a data transfer client component configured for:
preparing a storage medium for an import job, wherein preparing the storage medium comprises:
receiving a selection of data to be imported to a storage service infrastructure;
copying the data to the storage medium; and
generating a data transfer manifest for the storage medium; and
creating the import job using one or more data transfer objects as parameters; and
a data transfer storage service component configured for:
accessing the storage medium, wherein the storage medium corresponds to the data transfer manifest;
referencing the data transfer manifest, wherein the data transfer manifest at least provides data mapping between a storage service infrastructure and data in the storage medium; and
copying data from the storage medium to the storage service infrastructure, based on the data transfer manifest;
generating a log object for the import job, wherein the log object comprises, at least in part, a data error event associated with the data processed from the storage medium;
referencing the log object for an error event associated with the data, wherein the log object comprises the error event associated with the data based on validating the data; and
repairing a portion of the data associated with the error event, wherein the data is repaired using repair data retrieved from an identified location.

28. The system of claim 27, wherein the data transfer client component is further configured for:
receiving package information for the storage medium, wherein the package information is associated with a shipment of the storage medium.

29. The system of claim 27, further comprising the data transfer storage service component configured for:

validating the data based on a validation object in the data transfer manifest, wherein the validation object comprises checksums stored for individual portions of the data.

30. The system of claim 27, further comprising:
the data transfer client component configured for:
securing a portion of the storage medium that facilitates access to the data of the storage medium using a hash security object; and
communicating the hash security object using a secure channel that is different from a shipment of the storage medium.

31. The system of claim 30, further comprising:
the data transfer storage service component configured for:
receiving the hash security object using the secure channel;
verifying the integrity of the portion of the storage medium based on the hash security object; and
upon verifying the integrity of the portion of the storage medium, providing the storage medium for data transfer processing.

32. A system for exporting data to storage media, the system comprising:
a data transfer client component configured for:
receiving an indication of data to be exported from a storage service infrastructure; and
creating an export job using one or more data transfer objects as parameters; and
a data transfer storage service component configured for:
accessing the storage medium associated with an export job;
copying data from the storage service infrastructure to the storage medium;
generating a log object for the export job, wherein the data transfer client component operates to reference the log object for an error event associated with the data, wherein the log object comprises the error event associated with the data based on validating the data; and to repair a portion of the data associated with the error event, wherein the data is repaired using repair data retrieved from an identified location; and
generating a data transfer manifest, based on the one or more data transfer objects and the data copied from the storage service infrastructure, the data transfer manifest corresponds to the storage medium for the storage medium.

33. The system of claim 32, wherein the data transfer client component is further configured for:
receiving package information for the storage medium, wherein the package information is associated with a shipment of the storage medium.

34. The system of claim 33, further comprising the data transfer client component configured for:
validating the data based on a validation object in the data transfer manifest, wherein the validation object comprises checksums stored for individual portions of the data.

35. A computer-implemented method for verifying storage media for data transfer, the method comprising:
receiving a hash security object using a secure channel, wherein the hash security object selectively secures a master boot record with a boot sector a storage medium that facilitates access to the data on the storage medium;
verifying the integrity of the portion of the storage medium based on the hash security object; and
upon verifying the integrity of the portion of the storage medium, providing the storage medium for data transfer processing.

36. The method of claim 35, wherein processing the storage medium further comprises:
accessing the storage medium; and
copying data from the storage medium to the storage service infrastructure.

37. The method of claim 36, wherein the storage medium corresponds to a data transfer manifest, wherein the data transfer manifest at least provides data mapping between storage service infrastructure and data in the storage medium.

38. The method of claim 35, wherein processing the storage medium further comprises:
accessing the storage medium; and
copying data from the storage medium to a customer service infrastructure.

39. The method of claim 38, wherein the storage medium is associated with an export job, the export job corresponding to one or more data transfer objects.

40. The method of claim 38, wherein the storage medium is processed via a dedicated virtual machine that is securely segregated from the storage service infrastructure.

* * * * *